(12) United States Patent
Lee et al.

(10) Patent No.: US 7,436,119 B2
(45) Date of Patent: Oct. 14, 2008

(54) FLAT PANEL FLUORESCENT LAMP AND FABRICATING METHOD THEREOF

(75) Inventors: Hyeong Rag Lee, Daegu-Kwangyokshi (KR); Do Hyung Kim, Daegu-Kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 332 days.

(21) Appl. No.: 10/963,902

(22) Filed: Oct. 14, 2004

(65) Prior Publication Data
US 2005/0206298 A1 Sep. 22, 2005

(30) Foreign Application Priority Data
Mar. 22, 2004 (KR) ............. 10-2004-0019358

(51) Int. Cl.
*H01J 1/62* (2006.01)
*H01J 63/04* (2006.01)
*H01J 11/00* (2006.01)
*H01J 61/35* (2006.01)

(52) U.S. Cl. ............... 313/634; 313/567; 313/635; 313/495; 313/496; 313/497; 313/500; 313/502; 313/506; 313/493

(58) Field of Classification Search .............. None
See application file for complete search history.

(56) References Cited

U.S. PATENT DOCUMENTS

| 4,851,734 | A | 7/1989 | Hamai et al. |
|---|---|---|---|
| 5,073,743 | A | 12/1991 | Kajiwara et al. |
| 5,592,047 | A * | 1/1997 | Park et al. ............. 313/484 |
| 5,796,509 | A * | 8/1998 | Doany et al. ........... 359/254 |
| 2002/0024294 | A1 | 2/2002 | Matsukawa et al. |
| 2002/0105260 | A1 | 8/2002 | Lee |
| 2002/0113753 | A1* | 8/2002 | Sullivan et al. ........... 345/6 |
| 2002/0154258 | A1 | 10/2002 | Fujishiro et al. |
| 2004/0150318 | A1 | 8/2004 | Kim et al. |

FOREIGN PATENT DOCUMENTS

| EP | 1 659 616 A2 | 5/2006 |
|---|---|---|
| GB | 2 284 703 A | 5/1995 |
| GB | 2 289 790 A | 11/1995 |
| JP | 63174261 | 7/1988 |
| JP | 7062339 A | 3/1995 |

(Continued)

OTHER PUBLICATIONS

English Translation of JP 11-67087 (Kai et al.).*

(Continued)

*Primary Examiner*—Sikha Roy
*Assistant Examiner*—Natalie K Walford
(74) *Attorney, Agent, or Firm*—McKenna Long & Aldridge LLP

(57) ABSTRACT

The present invention provides a flat panel fluorescent lamp and fabricating method thereof, by which an acquisition rate of externally transmissive light and discharge uniformity are enhanced. The present invention includes a fluorescent layer on an upper plate to have a plurality of prominences and depressions, a lower plate leaving a predetermined gap from the upper plate to form a hermetic space together with the upper plate, at least one or more electrodes on the lower plate, and an insulating layer on the at least one or more electrodes.

38 Claims, 16 Drawing Sheets

FOREIGN PATENT DOCUMENTS

| | | | |
|---|---|---|---|
| JP | 11067087 A * | 3/1999 | |
| JP | 11-312498 | 11/1999 | |
| JP | 2001-118541 | 4/2001 | |
| JP | 2001-222978 | 8/2001 | |
| JP | 2002-319372 | 10/2002 | |
| KR | 2002-0053454 | 7/2002 | |
| WO | WO 02/101697 A1 | 12/2002 | |

OTHER PUBLICATIONS

English Translation of JP2001-118541 (Shigeta et al.).*

* cited by examiner

FLAT PANEL FLUORESCENT LAMP AND FABRICATING METHOD THEREOF

This application claims the benefit of the Korean Application No. P2004-19358 filed on Mar. 22, 2004, which is hereby incorporated by reference for all purposes as if fully set forth herein.

BACKGROUND OF THE INVENTION

1. Field of the Invention

The present invention relates to a backlight unit, and more particularly, to a flat panel fluorescent lamp and fabricating method thereof, by which discharge uniformity is enhanced.

2. Discussion of the Related Art

Generally, a cathode ray tube (CRT), one of various display devices, has been used as a monitor of a measuring equipment, information terminals, or the like, as well as televisions. Yet, large size and heavy weight of the CRT fail to meet the demand for compactness and lightweight of electronic products.

There are limitations on the weight and size of the CRT which is contrary to the trend of compactness and lightweight of various electronic products. Hence, there are various display devices expected to replace the CRT such as LCD (liquid crystal display) device using optical electric field effect, PDP (plasma display panel) using gas discharge, ELD (electroluminescent display) using electroluminescence, and the like. Specifically, many efforts to research and develop the LCD are underway.

In order to replace the CRT, the LCD, which is advantageous in compact/slim size, lightweight, low power consumption, and the like, has been widely researched and developed. The LCD has been developed enough to play a role as a flat panel display and is adopted as a monitor of a desktop computer, a wide information display device, and the like, as well as laptop computers. Hence, the demand for the LCD keeps rising.

The LCD is mostly a light-receiving device that displays an image by controlling an external incident light, thereby needing a separate light source for applying a light to an LCD panel, i.e., a backlight unit. The backlight unit used as a light source of LCD is categorized into an edge-light type and a direct-light type according to an installation location of a lamp unit.

EL (electroluminescence), LED (light-emitting diode), CCFL (cold cathode fluorescent lamp), HCFL (hot cathode fluorescent lamp), EEFL (external electrode fluorescent lamp), or the like can be used as the light source of the LCD. The CCFL, which is advantageous in long endurance, less power consumption, and thin slimness, is mainly used for a wide-screen color TFT LCD.

A CCFL light source uses a fluorescent discharge tube having Hg gas (with Ar, Ne, etc.) sealed therein at a low temperature in order to utilize a penning effect. Electrodes are formed at both ends of the tube. A cathode has a plate shape. When a voltage is applied to the electrodes, charged particles within the discharge tube collide with the cathode to produce secondary electrons. The secondary electrons excite neighbor elements to form plasma.

The excited elements irradiate strong UV-light and the UV-lights excite a fluorescent substance to irradiate a visible light.

In the edge-light type backlight unit, a lamp unit is provided to one side of a light-guide plate. And, the lamp unit consists of a lamp emitting light, a lamp holder inserted in both ends of the lamp to protect the lamp, and a lamp reflector enclosing an outer edge or circumference of the lamp to have one side fitted in a lateral side of the light guide plate to reflect the light emitted from the lamp toward the light guide plate.

The edge-light type backlight unit having the lamp unit provided to one side of the light guide plate is mainly applicable to a small-size LCDs, such as a laptop computer, a desktop computer, and the like. Hence, the edge-light type backlight unit provides excellent light uniformity, long endurance, and advantage of slimness of LCD.

The direct-light type backlight unit, which has been developed to cope with a wide-screen LCD over 20 inches, arranged a plurality of lamps in one line on a lower side of a diffusion plate to directly illuminate a front side of an LCD panel.

The direct-light type backlight unit has light efficiency higher than that of the edge-light type backlight unit, thereby being mainly adopted by a wide-screen LCD requiring high brightness.

FIG. 1 is a perspective diagram of a direct-light type backlight unit according to a related art, and FIG. 2 is a perspective diagram of electrode-connecting wires connected between a light-emitting lamp and a connector.

Referring to FIG. 1, a direct-light type backlight unit according to a related art consists of a plurality of light-emitting lamps 1 having insides coated with a fluorescent substance to emit light, an outer case 3 to support the light-emitting lamps 1, and a plurality of light-diffusion means 5a, 5b, and 5c provided between a liquid crystal display panel (not shown in the drawing) and the light-emitting lamps 1.

The light-diffusion means 5a, 5b, and 5c prevent the shape of the light-emitting lamps 1 from appearing on a display surface of the liquid crystal display panel and provide a light source having a uniform luminosity distribution overall. In order to enhance a light-diffusion effect, a plurality of diffusion sheets and plates are arranged between the liquid crystal display panel and the light-emitting lamps 1.

A reflector 7 is provided to an inside of the outer case 3 to condense the lights emitted from the light-emitting lamps 1 on a display part of the liquid crystal display panel. This is to maximize efficiency of light use.

Each of the light-emitting lamps 1, as illustrated in FIG. 2, consists of a cold cathode fluorescent lamp (CCFL). Electrodes 2 and 2a are provided to respective ends of a tube. When power is applied to the electrodes 2 and 2a, the corresponding light-emitting lamp 1 emits light. Respective ends of the light-emitting lamp 1 are fitted in holes formed at respective sides of the outer case 3.

Electrode-connecting wires 9 and 9a for transferring external power for driving the corresponding lamp are connected to the electrodes 2 and 2a of the light-emitting lamp 1, respectively. The electrode-connecting wires 9 and 9a are connected to a separate connector 11 to be connected to a driver circuit. Hence, the connector 11 should be provided to each of the light-emitting lamps 1.

Namely, one electrode-connecting wire 9 connected to one electrode 2 of the light-emitting lamp 1 and the other electrode-connecting wire 9a connected to the other electrode 2a of the light-emitting lamp 1 are connected to one connector 11. One of the electrode connecting wires 9 and 9a is bent toward a rear side of the outer case 3 to be connected to the connector 11.

FIG. 3 is a cross-sectional diagram of a flat panel fluorescent lamp according to a related art.

Referring to FIG. 3, a flat panel fluorescent lamp unit according to a related art consists of an upper plate 21 formed of a transparent material, a fluorescent layer 22 formed on a rear side of the upper plate 21, a lower plate 23 provided to leave a predetermined gap from the upper plate 21, a plurality of ribs 24 formed on the lower plate 23 having a predetermined distance from each other, a plurality of electrodes 25 enclosing a plurality of the ribs 24, respectively, a dielectric layer 26 covering each surface of the electrodes 25, and a peripheral wall 27 supporting both edges of the upper and lower plates 21 and 23 to provide the gap between the upper plate 21 and the lower plate 23.

A height of the peripheral wall 27 is greater than that of each of the electrodes 25, whereby electric discharge can occur between the electrodes 25.

In the above-configured flat panel fluorescent lamp of the related art, a plurality of the electrodes 25 are grouped into odd-numbered electrodes and even-numbered electrodes to be connected to an AC-power supply.

Consequently, electric discharge is produced between the odd-numbered electrodes and the even-numbered electrodes. Alternatively, a plurality of the electrodes can be grouped into a plurality of pairs of two neighbor electrodes to be connected to the same power supply.

In the related art flat panel fluorescent lamp, a plurality of the electrodes 25 protruding from the lower plate 23 produce plasma by AC type electric discharge, the plasma irradiates UV-light to excite the fluorescent layer 22 on the upper plate 21, and the excited fluorescent layer 22 irradiates a visible light outside the upper plate 21.

The gas employs a mixed gas with Xe as well as Hg.

The AC type electric discharge is performed in a manner of applying alternating polarities of power to the electrodes 25 coated with the dielectric layer 26.

A width and protruding height of the electrode 25 and the distance between the electrodes 25 are set in a manner of considering a gas pressure and electric discharge efficiency. For instance, the distance between the electrodes 25 is set smaller than 1 mm for electric discharge of the gas at a high pressure of several hundreds Torr.

The rib-type electrodes may be formed by printing. The dielectric layer 26 is to prevent the electrodes from being damaged by ions and to raise the discharge of the secondary electrons.

However, the related art flat panel fluorescent lamp has the following problems or disadvantages.

Namely, an acquisition rate of externally transmissive light is low and uniformity of electric discharge is reduced, whereby brightness and efficiency required for a wide-screen liquid crystal display device cannot be met.

SUMMARY OF THE INVENTION

Accordingly, the present invention is directed to a flat panel fluorescent lamp and fabricating method thereof that substantially obviate one or more problems due to limitations and disadvantages of the related art.

An advantage of the present invention is to provide a flat panel fluorescent lamp and fabricating method thereof, by which an acquisition rate of externally transmissive light and discharge uniformity are enhanced.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a flat panel fluorescent lamp according to the present invention includes a fluorescent layer on an upper plate to have a plurality of prominences and depressions, a lower plate leaving a predetermined gap from the upper plate to form a hermetic space together with the upper plate, at least one or more electrodes on the lower plate, and an insulating layer on the at least one or more electrodes.

In another aspect of the present invention, a method of fabricating a flat panel fluorescent lamp includes the steps of forming a fluorescent layer having a plurality of prominences and depressions on an upper plate, forming at least one or more electrodes on a lower plate confronting the upper plate, forming an insulating layer on the at least one or more electrodes, and assembling the upper and lower plates so that the fluorescent layer confronts the insulating layer to leave a uniform gap.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

FIGS. 4A to 4E are cross-sectional diagrams of various upper plates of a flat panel fluorescent lamp according to the present invention.

Figure 1:
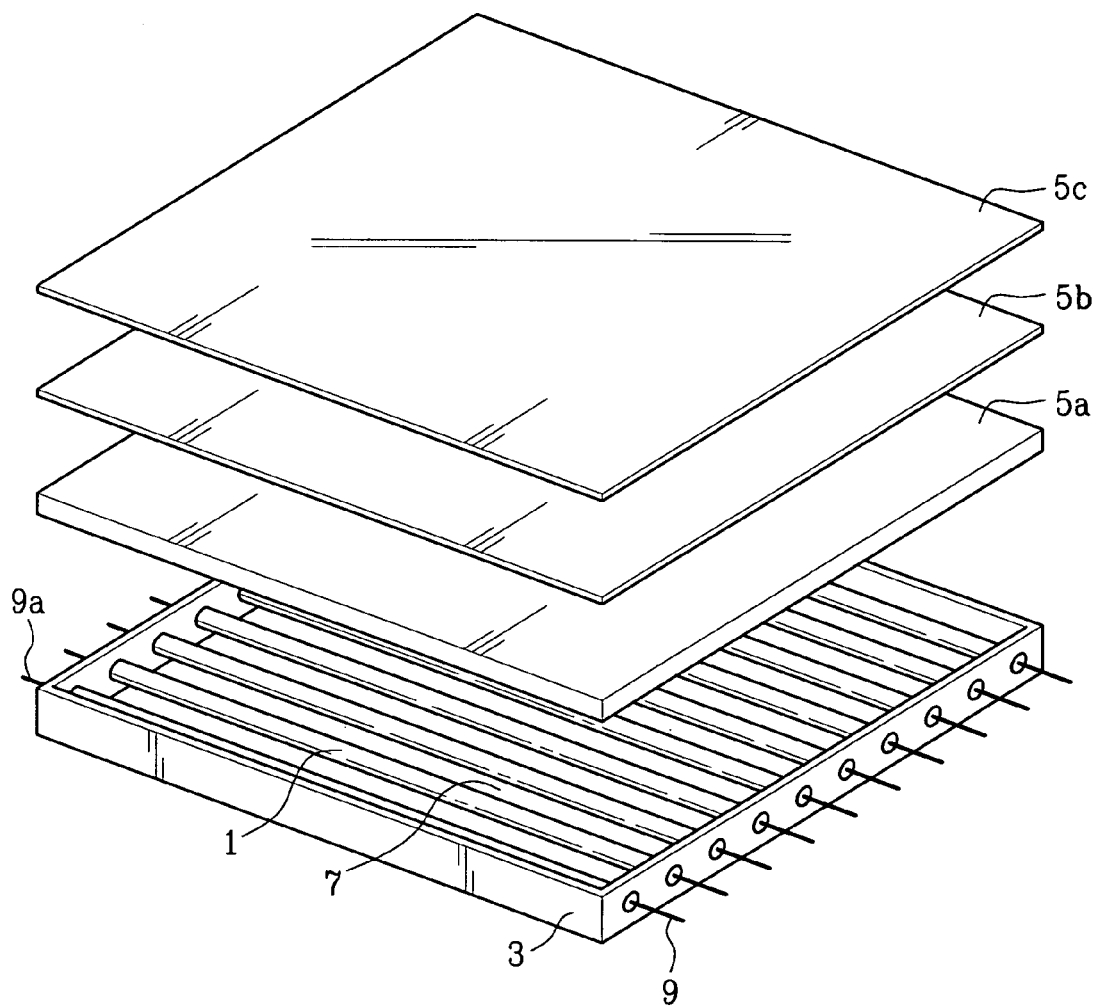
FIG. 1 is a perspective diagram of a direct-light type backlight unit according to a related art.
Figure 2:
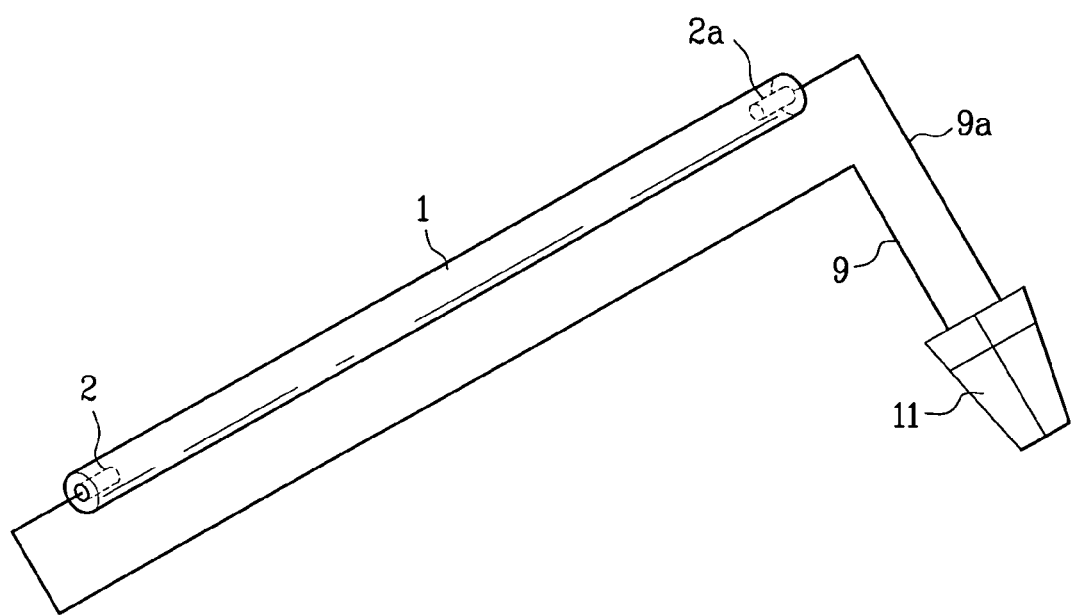
FIG. 2 is a perspective diagram of electrode-connecting wires connected between a light-emitting lamp and a connector.
Figure 3:
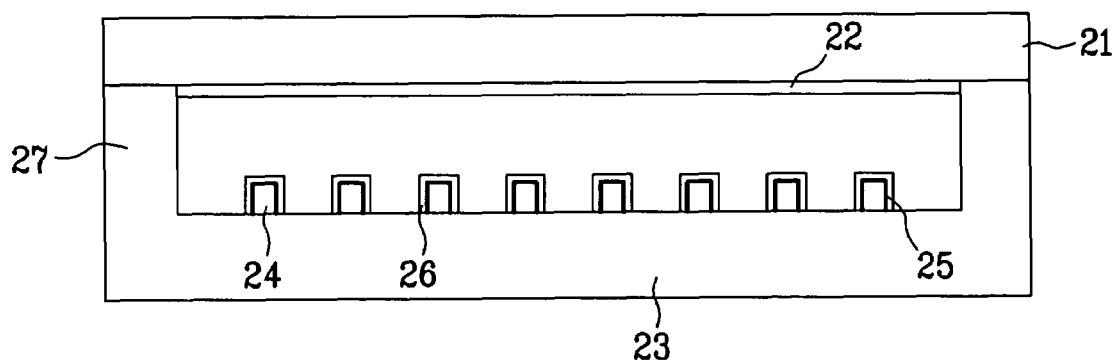
FIG. 3 is a cross-sectional diagram of a flat panel fluorescent lamp unit according to a related art.
Figure 4A:
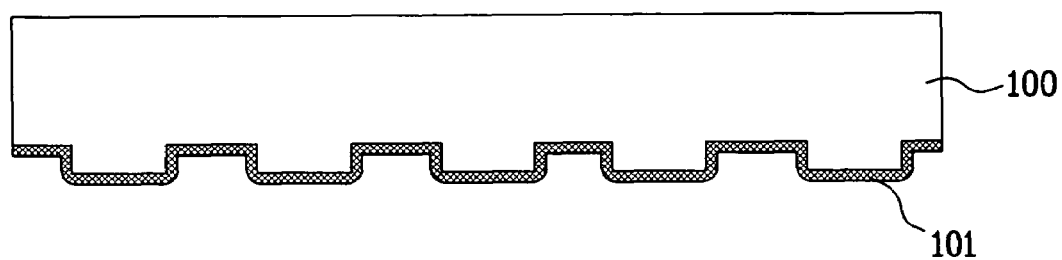
FIGS. 4A to 4E are cross-sectional diagrams of various upper plates of a flat panel fluorescent lamp according to the present invention.

Referring to FIG. 4A, a plurality of prominences and depressions are formed on a surface of an upper plate 100 formed of a transparent material and a first fluorescent layer 101 is formed on an entire surface of the upper plate including the prominences and depressions.

The above-configured upper plate 100 may be fabricated by forming a plurality of the prominences and depressions by performing photolithography on the upper plate 100 to selectively remove portions of the surface of the upper plate 100 to a predetermined depth and by forming the first fluorescent layer 101 on the entire surface of the upper plate 100 including the prominences and depressions.

Figure 4B:
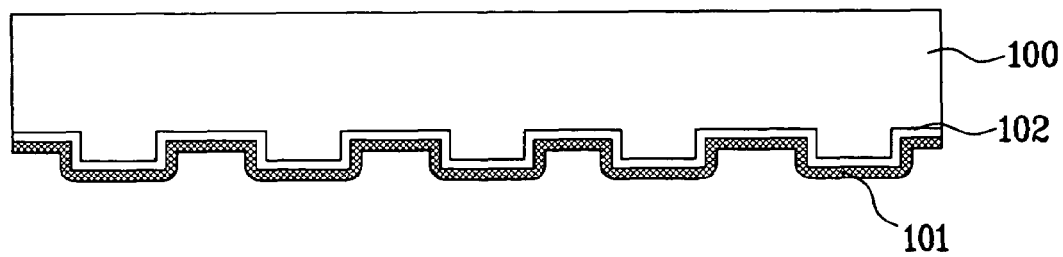

Referring to FIG. 4B, the plurality of prominences and depressions are formed on a surface of an upper plate 100 formed of a transparent material. A transparent electrode 102 is formed on an entire surface of the upper plate 100 including the prominences and depressions. A first fluorescent layer 101 is formed on the transparent electrode 102.

The above-configured upper plate 100 may be fabricated by forming a plurality of the prominences and depressions by performing photolithography on the upper plate 100 to selectively remove portions of the surface of the upper plate 100 to a predetermined depth, by forming the transparent electrode 102 on the entire surface of the upper plate 100 including the prominences and depressions, and by forming the first fluorescent layer 101 on the transparent electrode 102.

Meanwhile, the prominences and depressions formed on the surface of the upper plate 100 may have wave patterns, saw-tooth patterns, or other irregular shapes.

Figure 4C:
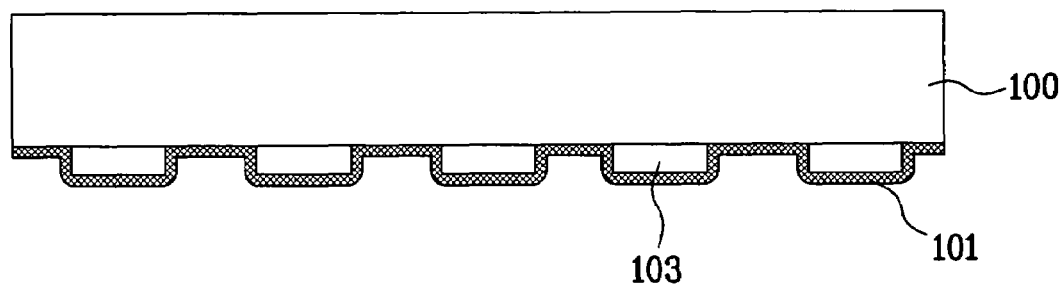

Referring to FIG. 4C, a plurality of transparent electrode patterns 103 formed of a transparent metal such as ITO are formed on an upper plate 100 formed of a transparent material to leave a predetermined distance from each other. A first fluorescent layer 101 is formed on an entire surface of the upper plate 100 including the transparent electrode patterns 103.

In this case, the transparent electrode patterns 103 may be irregular.

The above-configured upper plate 100 may be fabricated by depositing the transparent metal such as ITO on the upper plate 100, by forming a plurality of the transparent electrode patterns 103 by performing photolithography on the upper plate 100 to selectively remove portions of the transparent metal, and by forming the first fluorescent layer 101 on an entire surface of the upper plate 100 including the transparent electrode patterns 103.

Figure 4D:
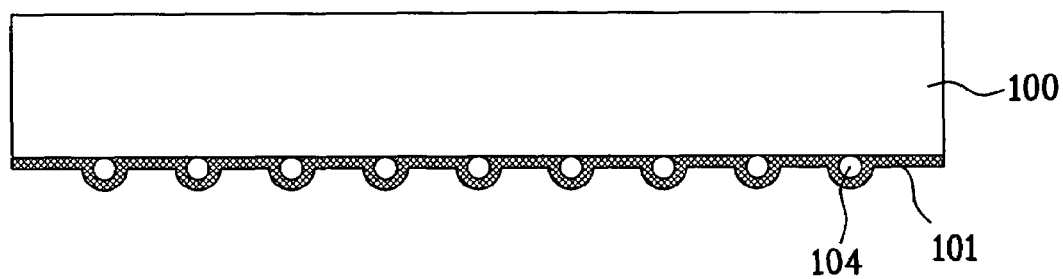

Referring to FIG. 4D, a plurality of transparent particles 104 formed of a transparent material are formed on an upper plate 100 formed of a transparent material. And, a first fluorescent layer 101 is formed on an entire surface of the upper plate 100 including the transparent particles 104.

By considering a refraction index, acquisition feasibility, shaping feasibility, and the like, an inorganic material or resin may be used as a material of the transparent particles 104.

Specifically, in case of using resin or inorganic oxide as the inorganic material, the transparent particles 104 can be easily amorphous. In case of using a material facilitating crystallization, the obtained particle generally tends to have an indeterminate form due to its crystalline structure. For such a reason, it is difficult to form a transparent particle 104 having a smooth surface including either convex surfaces or a combination of convex surfaces and planes.

Hence, using the material that tends to be amorphous, such as inorganic oxide and resin, the particle shape depends on a surface tension and the like. Thus, formation of a transparent particle 104 having a smooth surface including either convex surfaces or a combination of convex surfaces and planes is facilitated.

Crystallinity of the transparent particle 104 can be determined by investigating presence or non-presence of peaks due to the diffraction on a crystalline face using XRD (X-ray diffraction) measurement.

In case of using a mixture of amorphous transparent particles and crystalline transparent particles as the transparent particles 104, a 'crystalline transparent particles to total transparent particles' ratio is preferably set to about 30 wt % or less.

And, particles of silica gel, alumina, or the like can be used as the transparent particles 104 of inorganic oxide.

Moreover, the transparent particles 104 formed of resin can be fluoropolymer particles or silicon resin particles such as the particles of acryl, styrene acryl & its cross-linking agent, melamine-formalin condensate, PTFE (polytetra-fluoroethylene), PFA (perfluoroalkoxy resin), FEP (tetrafluoroethylene-hexafluoropropylene copolymer), DVDF (polyfluorovinylidene), ETFE (ethylene-tetrafluoroethylene copolmer), etc. Silicon resin, melamine resin, or fluoroacrylate resin may be preferably used for the transparent particles 104.

Since the transparent resin mostly has a relatively low refraction index, a silica particle or silicon resin particle having a low refraction index of about 1.40~1.45 (halogen lamp D-ray, 589 nm) is suitable for the transparent particles 104.

Meanwhile, the above-configured upper plate structure is fabricated in a manner of dispersing a plurality of the transparent particles 104 on the upper plate 100 and forming the first fluorescent layer 101 one an entire surface of the upper plate 100 including a plurality of the transparent particles 104.

Figure 4E:
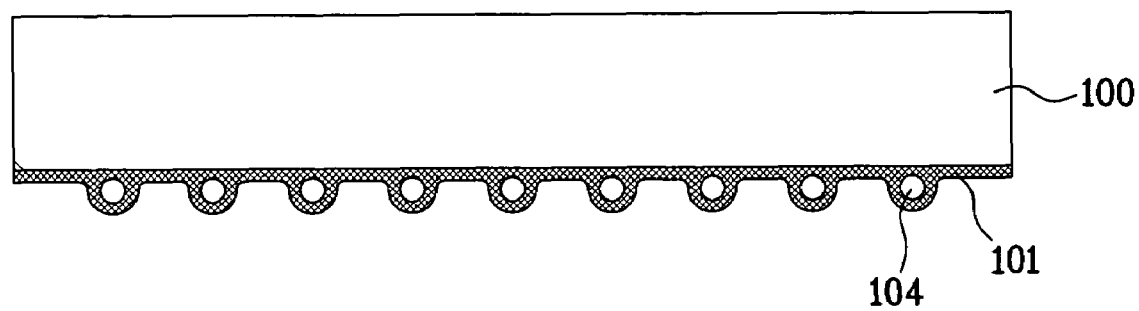

Referring to FIG. 4E, a first fluorescent layer 101 mixed with a plurality of transparent particles 104 is formed on an upper plate 100 formed of a transparent material.

The above-configured upper plate structure is fabricated in a manner of mixing a plurality of the transparent particles 104 with a material of the first fluorescent layer 101 and forming the first fluorescent layer 101 mixed with the transparent particles 104 on the upper plate 100.

Meanwhile, the first fluorescent layers 101 in FIGS. 4A to 4E can be formed of any material enabling photoluminescence that produces visible light using energy of a UV-light of about 140 nm~350 nm wavelength such as an organic substance, inorganic substance, rare-earth metal, polymer, and the like. The first fluorescent layer 101 may be formed of a fluorescent substance producing a high visible light in case of irradiation of vacuum UV-light of about 147 nm or about 174 nm wavelength.

FIGS. 5A to 5E are cross-sectional diagrams of various lower plates of a flat panel fluorescent lamp according to the present invention.

Figure 5A:
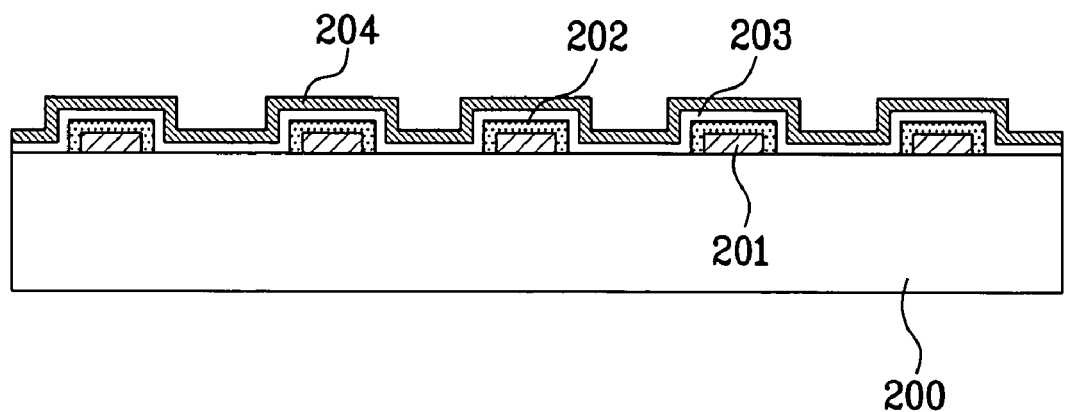
FIGS. 5A to 5E are cross-sectional diagrams of various lower plates of a flat panel fluorescent lamp according to the present invention.

Referring to FIG. 5A, a lower plate structure includes a plurality of electrodes 201 formed on the lower plate 200 of a transparent material having a uniform distance from each other, an insulating layer 202 enclosing each of the electrodes 201, a reflective layer 203 formed on an entire surface of the lower plate 200 including the insulating layer 202, and a second fluorescent layer 204 formed on the reflective layer 203.

The reflective layer 203 is formed of such a material as AlN, $BaTiO_3$, $SiN_x$, $Sio_x$, and the like lead visible light emitted from the second fluorescent layer 204 to the upper plate 100, thereby improving light efficiency.

The above-configured lower plate structure may be fabricated by depositing a metal layer on the lower plate 200, by forming a plurality of the electrodes 201 to leave the predetermined distance from each other by removing the metal layer selectively by photolithography, by forming the insulating layer 202 by performing screen printing or the like on surfaces of the electrodes 201, by forming the reflective layer 203 on an entire surface of the lower plate 200 including the insulating layer 202, and by forming the second fluorescent layer 204 on the reflective layer 203, in turn.

Figure 5B:
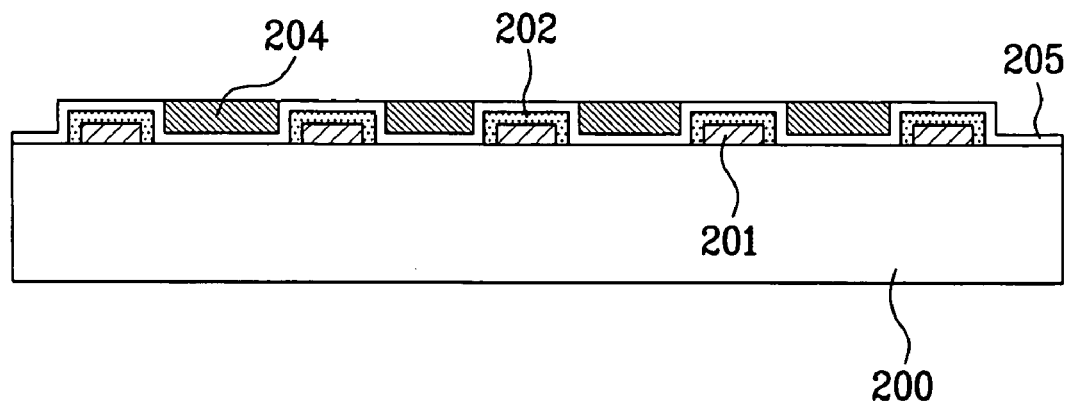

Referring to FIG. 5B, a lower plate structure includes a plurality of electrodes 201 formed on the lower plate 200 of a transparent material to leave a uniform distance from each other, an insulating layer 202 enclosing each of the electrodes 201, a secondary electron-producing layer 205 formed on an entire surface of the lower plate 200 including the insulating layer 202, and a second fluorescent layer 204 only formed on the secondary electron-producing layer 205 between the electrodes 201.

The above-configured lower plate structure may be fabricated by depositing a metal layer on the lower plate 200, by forming a plurality of the electrodes 201 to leave the predetermined distance from each other by removing the metal layer selectively by photolithography, by forming the insulating layer 202 by performing screen printing or the like on surfaces of the electrodes 201, by forming the secondary electron-producing layer 205 on an entire surface of the lower plate 200 including the insulating layer 202, and by forming the second fluorescent layer 204 on the secondary electron-producing layer between the electrodes 201, in turn.

Figure 5C:
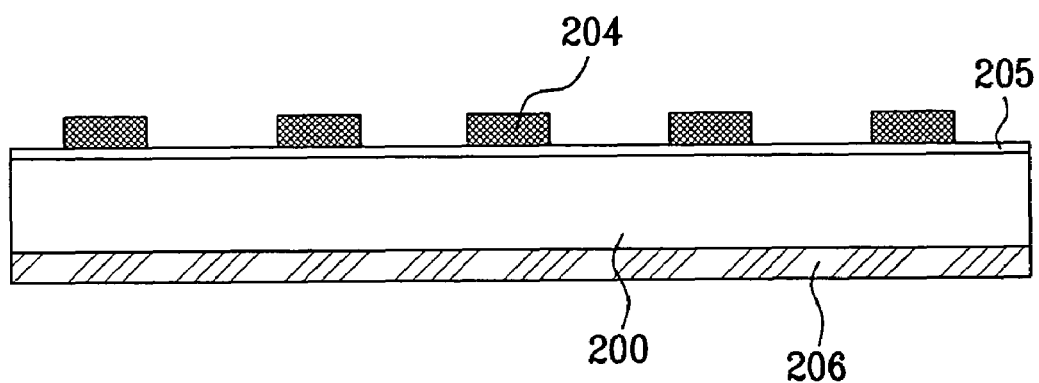

Referring to FIG. 5C, a lower plate structure includes a lower plate 200 formed of a transparent material, a secondary electron-producing layer 205 formed on a front side of the lower plate 200, a discharge electrode 206 formed on a back side of the lower plate 200, and a plurality of second fluorescent layers 204 formed on the secondary electron-producing layer 205 having a uniform distance from each other.

The above-configured lower plate structure may be fabricated by forming the secondary electron-producing layer 205 on the front side of the lower plate 200, by forming a plurality of the second fluorescent layers 204 on the secondary electron-producing layer 205 to leave a predetermined distance from each other, and by forming the discharge electrode 206 on the back side of the lower plate 200.

Figure 5D:
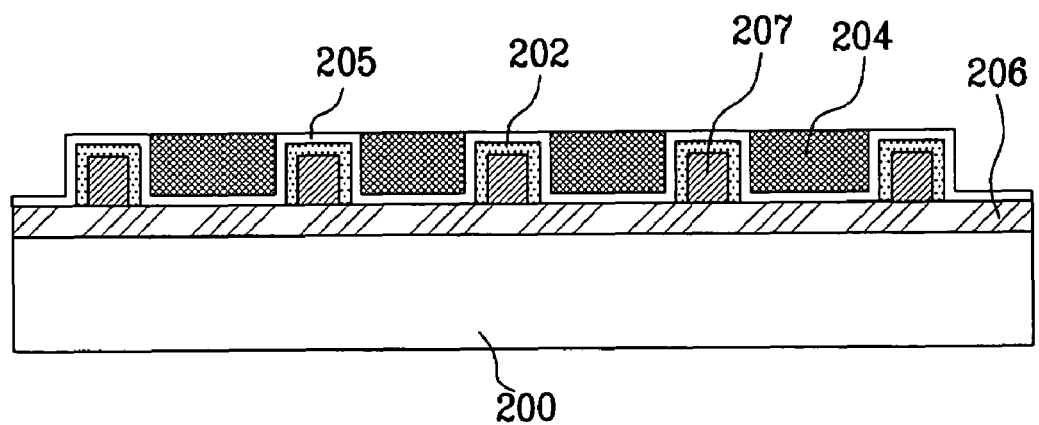

Referring to FIG. 5D, a lower plate structure includes a lower plate 200 formed of a transparent material, a discharge electrode 206 formed on the lower plate 200, a plurality of vertical structures 207 formed on the discharge electrode 206 to leave a uniform distance from each other, an insulating layer 202 enclosing each of the vertical structures 207, a secondary electron-producing layer 205 formed on an entire surface of the lower plate 200 including the insulating layer 202, and a secondary fluorescent layer 204 formed on the secondary electron-producing layer 205 between the vertical structures 207.

The above-configured lower plate structure may be fabricated by forming the discharge electrode 206 on the lower plate 200, forming a plurality of vertical structures 207 on the discharge electrode 206 having a uniform distance from each other, by forming the insulating layer 202 to enclose each of the vertical structures 207, by forming the secondary electron-producing layer 205 on an entire surface of the lower plate 200 including the insulating layer 202, and by forming the secondary fluorescent layer 204 on the secondary electron-producing layer 205 between the vertical structures 207.

In FIGS. 5B to 5D, the secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound enabling to amplify an electron ray. Cu/Be or Ag/Mg may generally be used for the secondary electron-producing layer 205.

The second fluorescent layer 204 provided to the lower plate 200 in FIGS. 5A to 5D can be formed of any material enabling photoluminescence that produces visible light using energy of a UV-light of 140 nm~350 nm wavelength such as an organic substance, inorganic substance, rare-earth metal, polymer, and the like. The second fluorescent layer 204 may be formed of a fluorescent substance producing high visible light in case of irradiation of vacuum UV-light of about 147 nm or 174 nm wavelength.

Meanwhile, in case of using the secondary electron-producing layer 205, the second fluorescent layer 204 has a patterned shape. Electric charges generated from the gas discharge need to directly collide with the secondary electron-producing layer 205 to enable discharge of secondary electrons. If the fluorescent substance entirely covers the secondary electron-producing layer, electric charges fail to directly collide with the secondary electron-producing layer 205 to result in no effect.

In case of using the secondary electron-producing layer 205, the fluorescent layer is not provided to the lower plate 200. Alternatively, if the fluorescent layer is provided to the lower plate to raise brightness with luminosity of the fluorescent layer on the lower plate, the fluorescent layer is patterned in a "block" shape to expose portions of the secondary electron-producing layer 205. Hence, the fluorescent substance provided to portions of the lower plate emits light, and the secondary electron-producing layer 205 discharges the secondary electrons.

Figure 5E:
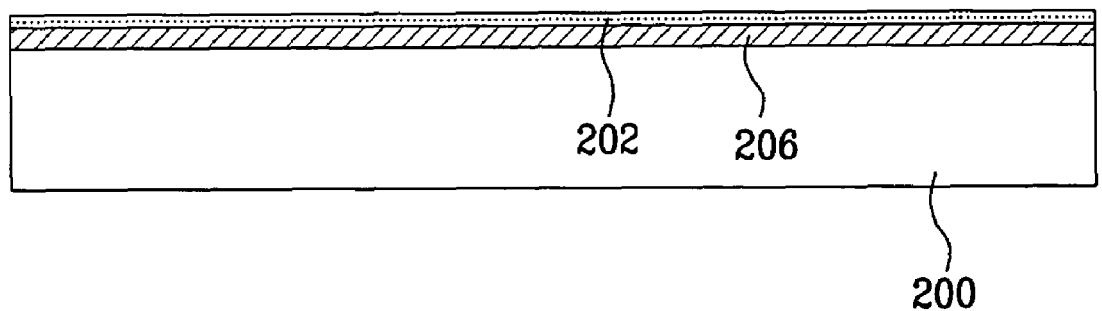

Referring to FIG. 5E, a lower plate structure includes a lower plate 200 formed of a transparent material, a discharge electrode 206 formed on the lower plate 200, and an insulating layer 202 formed on the discharge electrode 206.

The lower plate structure may be fabricated by forming the discharge electrode 206 on the lower plate 200 and by forming the insulating layer 202 on the discharge electrode 206.

The above-configured upper plate in FIG. 4A, 4B, 4C, 4D, or 4E and the above-configured lower plate in FIG. 5A, 5B, 5C, 5D, or 5E are assembled via sealing to leave a predetermined gap between them. An electric discharge gas is injected between the sealed upper and lower plates to complete a flat panel fluorescent lamp.

Hence, the flat panel fluorescent lamp according to the present invention enables to basically provide twenty-five embodiments by using various combinations of the upper plate and lower plate configurations.

Specifically, the twenty-five embodiments of the present invention are an assembly of the upper plate in FIG. 4A and the lower plate in FIG. 5A, an assembly of the upper plate in FIG. 4A and the lower plate in FIG. 5B, an assembly of the upper plate in FIG. 4A and the lower plate in FIG. 5C, an assembly of the upper plate in FIG. 4A and the lower plate in FIG. 5D, an assembly of the upper plate in FIG. 4A and the lower plate in FIG. 5E, an assembly of the upper plate in FIG. 4B and the lower plate in FIG. 5A, an assembly of the upper plate in FIG. 4B and the lower plate in FIG. 5B, an assembly of the upper plate in FIG. 4A and the lower plate in FIG. 5C, an assembly of the upper plate in FIG. 4A and the lower plate in FIG. 5D, an assembly of the upper plate in FIG. 4A and the lower plate in FIG. 5E, an assembly of the upper plate in FIG. 4C and the lower plate in FIG. 5A, an assembly of the upper plate in FIG. 4C and the lower plate in FIG. 5B, an assembly of the upper plate in FIG. 4C and the lower plate in FIG. 5C, an assembly of the upper plate in FIG. 4C and the lower plate in FIG. 5D, an assembly of the upper plate in FIG. 4C and the lower plate in FIG. 5E, an assembly of the upper plate in FIG. 4D and the lower plate in FIG. 5A, an assembly of the upper plate in FIG. 4D and the lower plate in FIG. 5B, an assembly of the upper plate in FIG. 4D and the lower plate in FIG. 5C, an assembly of the upper plate in FIG. 4D and the lower plate in FIG. 5D, an assembly of the upper plate in FIG. 4D and the lower plate in FIG. 5E, an assembly of the upper plate in FIG. 4E and the lower plate in FIG. 5A, an assembly of the upper plate in FIG. 4E and the lower plate in FIG. 5B, an assembly of the upper plate in FIG. 4E and the lower plate in FIG. 5C, an assembly of the upper plate in FIG. 4E and the lower plate in FIG. 5D, and an assembly of the upper plate in FIG. 4E and the lower plate in FIG. 5E.

Meanwhile, a spacer is provided between edges of the upper and lower plates in assembling the upper and lower plates to leave a predetermined gap between the upper and lower plates. A sealed space is provided between the assembled upper and lower plates having the predetermined gap. The electric discharge gas is injected in the sealed space.

Cylindrical or ball-shaped transparent insulator particles can be used as the spacer.

Moreover, the upper and lower plates may be assembled by applying an adhesive agent, e.g., UV-hardening agent, epoxy, etc., to an edge area of the upper or lower plate, aligning the upper and lower substrates with each other in an alignment chamber, sealing the chamber hermetically, adjusting a ratio of gas to be injected to fill the chamber with the gas, and pressurizing the upper or lower plate within the chamber.

In order to completely assemble the upper and lower plates to each other, UV-light or laser beam or heat at a specific temperature can be applied to the adhesive agent to cure or partially cure the agent.

The insulating layer enclosing the electrodes in FIGS. 5A to 5E may be formed by screen printing.

Some of the flat panel fluorescent lamps according to the twenty-five embodiments of the present invention are explained as follows.

Figure 6:
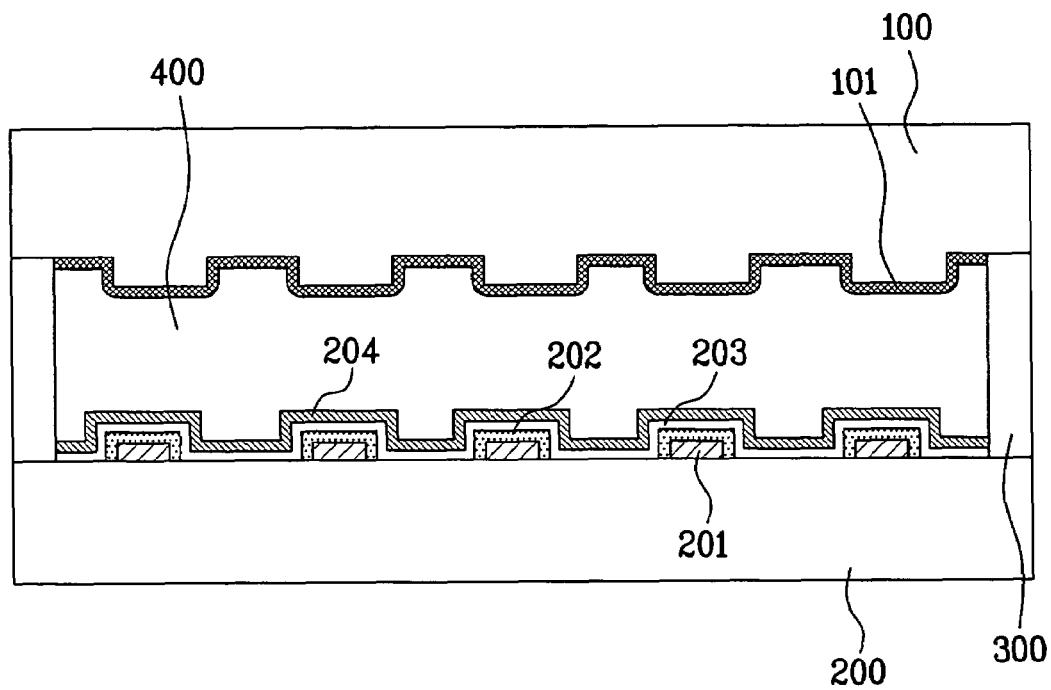
FIG. 6 is a cross-sectional diagram of a flat panel fluorescent lamp according to a first embodiment of the present invention.

FIG. 6 is a cross-sectional diagram of a flat panel fluorescent lamp according to a first embodiment of the present invention, in which the assembly of the upper plate in FIG. 4A and the lower plate in FIG. 5A is illustrated.

Referring to FIG. 6, a flat panel fluorescent lamp according to a first embodiment of the present invention includes an upper plate 100 having a plurality of prominences and depressions on its surface, a first fluorescent layer 101 on the upper plate 100 having the prominences and depressions, a lower plate 200 forming a hermetic space with the upper plate 100 to have a predetermined gap from the upper plate 100, a plurality of electrodes 201 on the lower plate 200 having a uniform distance from each other, an insulating layer 202 enclosing each of the electrodes 201, a reflective layer 203 on an entire surface of the lower plate 200 including the insulating layer 202 and electrodes 201, a second fluorescent layer 204 on the reflective layer 203, a spacer 300 between edge areas of the upper and lower plates 100 and 200 to provide the predetermined gap between the upper and lower plates 100 and 200, and a discharge gas 400 within the hermetic space between the upper and lower plates 100 and 200.

A metal of low specific resistance such as Cr, Ag, Pt, and Cu may be used for the electrodes 201 on the lower plate 200.

Moreover, the upper and lower plates 100 and 200 are hermetically attached to each other by the spacer 300 such as a glass solder.

The discharge gas 400 may include of Hg, Xe, Ne, Ar, He, or a mixture gas of Hg, Xe, Ne, Ar, and He and is injected into the hermetic space between the upper and lower plates 100 and 200 via a gas inlet (not shown in the drawing) that is subsequently sealed.

Meanwhile, a coating area of the first fluorescent layer 101 is increased by the prominences and depressions on the upper plate 100, thereby enhancing a produced amount of visible light and reducing total reflection on a flat panel. Hence, an acquisition rate of externally transmissive light can be enhanced.

The first and second fluorescent layers 101 and 204 can be formed of any material enabling photoluminescence that produces visible light using energy of a UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of 147 nm or about 174 nm wavelength.

Moreover, the reflective layer 203 on the lower plate 200 is formed of such a material as AlN, $BaTiO_3$, $SiN_x$, $SiO_x$, and the like leads visible light emitted from the second fluorescent layer 204 to the upper plate 100, thereby improving light efficiency.

Besides, the prominences and depressions formed on the surface of the upper plate 100 may have wave patterns, sawtooth patterns, or irregular shapes.

Cylindrical or ball-shaped transparent insulator particles can be used as the spacer 300.

Figure 7:
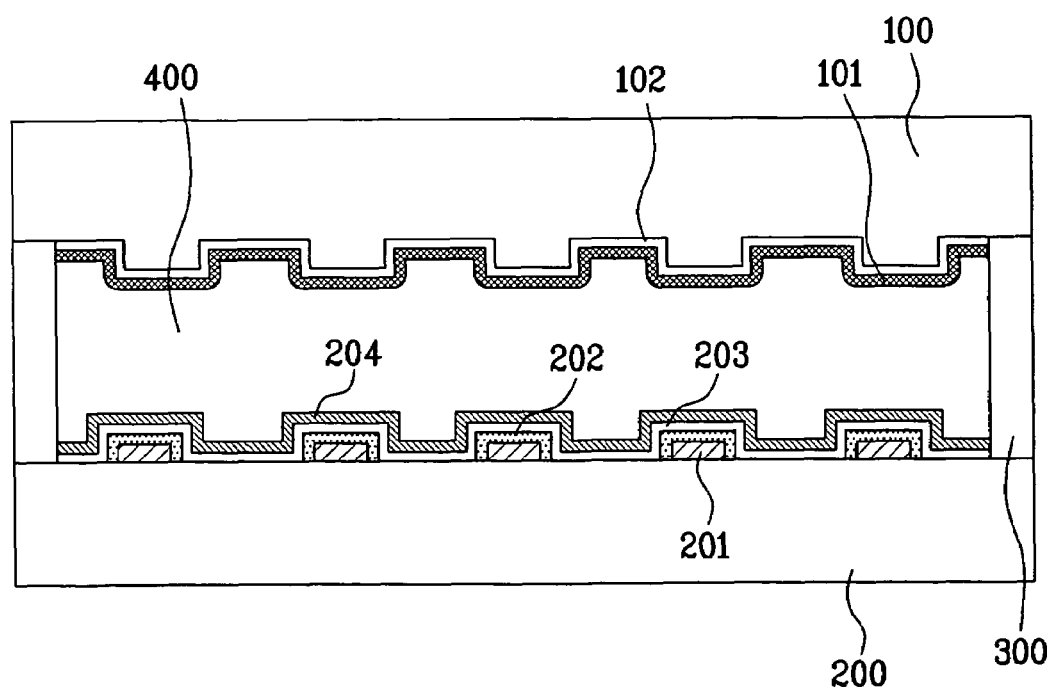
FIG. 7 is a cross-sectional diagram of a flat panel fluorescent lamp according to a second embodiment of the present invention.

FIG. 7 is a cross-sectional diagram of a flat panel fluorescent lamp according to a second embodiment of the present invention, in which the assembly of the upper plate in FIG. 4B and the lower plate in FIG. 5A is illustrated.

Referring to FIG. 7, a flat panel fluorescent lamp according to a second embodiment of the present invention includes an upper plate 100 having a plurality of prominences and depressions on a surface of its backside, a transparent electrode 102 on the upper plate 100 including the prominences and depressions, a first fluorescent layer 101 on the transparent electrode 102, a lower plate 200 forming a hermetic space with the upper plate 100 to have a predetermined gap from the upper plate 100, a plurality of electrodes 201 on the lower plate 200 having a uniform distance from each other, an insulating layer 202 enclosing each of the electrodes 201, a reflective layer 203 on an entire surface of the lower plate 200 including the insulating layer 202 and electrodes 201, a second fluorescent layer 204 on the reflective layer 203, a spacer 300 between edge areas of the upper and lower plates 100 and 200 to support the upper and lower plates 100 and 200, and a discharge gas 400 within the hermetic space between the upper and lower plates 100 and 200.

The discharge gas 400 may include Hg, Xe, Ne, Ar, He, or a mixture gas of Hg, Xe, Ne, Ar, and He and is injected into the hermetic space between the upper and lower plates 100 and 200.

A coating area of the first fluorescent layer 101 is increased by the prominences and depressions on the upper plate 100, thereby enhancing a produced amount of visible light and reducing total reflection on a flat panel. Hence, light efficiency can be enhanced.

Moreover, the first and second fluorescent layers 101 and 204 can be formed of any material enabling photoluminescence that produces visible light using energy of UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of about 147 nm or about 174 nm wavelength.

The reflective layer 203 on the lower plate 200 leads visible light emitted from the second fluorescent layer 204 to the upper plate 100, thereby improving light efficiency.

Besides, the prominences and depressions formed on the surface of the upper plate 100 may have wave patterns, saw-tooth patterns, or irregular shapes.

Cylindrical or ball-shaped transparent insulator particles can be used as the spacer 300.

In the above configured flat panel fluorescent lamp according to the second embodiments of the present invention, electric discharge occurs between the transparent electrode 102 of the upper plate 100 and the electrodes 201 of the lower plate 200.

Figure 8:
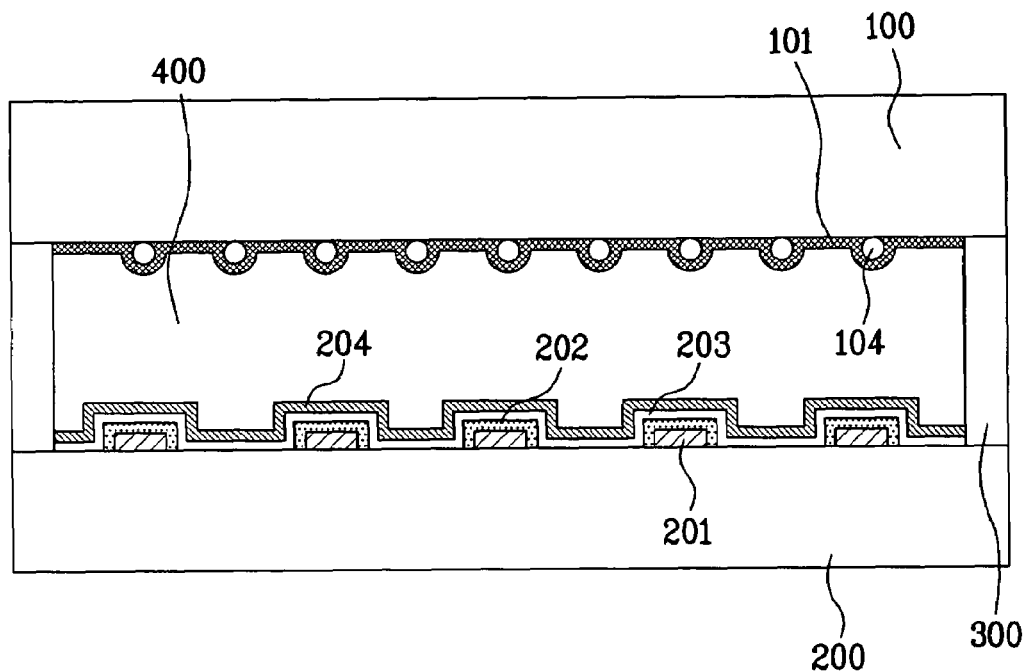
FIG. 8 is a cross-sectional diagram of a flat panel fluorescent lamp according to a third embodiment of the present invention.

FIG. 8 is a cross-sectional diagram of a flat panel fluorescent lamp according to a third embodiment of the present invention, in which the assembly of the upper plate in FIG. 4C and the lower plate in FIG. 5A is illustrated.

Referring to FIG. 8, a flat panel fluorescent lamp according to a third embodiment of the present invention includes an upper plate 100 formed of a transparent material, a plurality of ball type transparent particles 104 on the upper plate 100, a first fluorescent layer 101 on an entire surface of the upper plate 100 including the transparent particles 104, a lower plate 200 forming a hermetic space with the upper plate 100 to have a predetermined gap from the upper plate 100, a plurality of electrodes 201 on the lower plate 200 having a uniform distance from each other, an insulating layer 202 enclosing each of the electrodes 201, a reflective layer 203 on an entire surface of the lower plate 200 including the insulating layer 202 and electrodes 201, a second fluorescent layer 204 on the reflective layer 203, a spacer 300 between edge areas of the upper and lower plates 100 and 200 to support the upper and lower plates 100 and 200, and a discharge gas 400 existing within the hermetic space between the upper and lower plates 100 and 200.

The discharge gas 400 may include Hg, Xe, Ne, Ar, He, or a mixture gas of Hg, Xe, Ne, Ar, and He and is injected into the hermetic space between the upper and lower plates 100 and 200.

Figure 17:
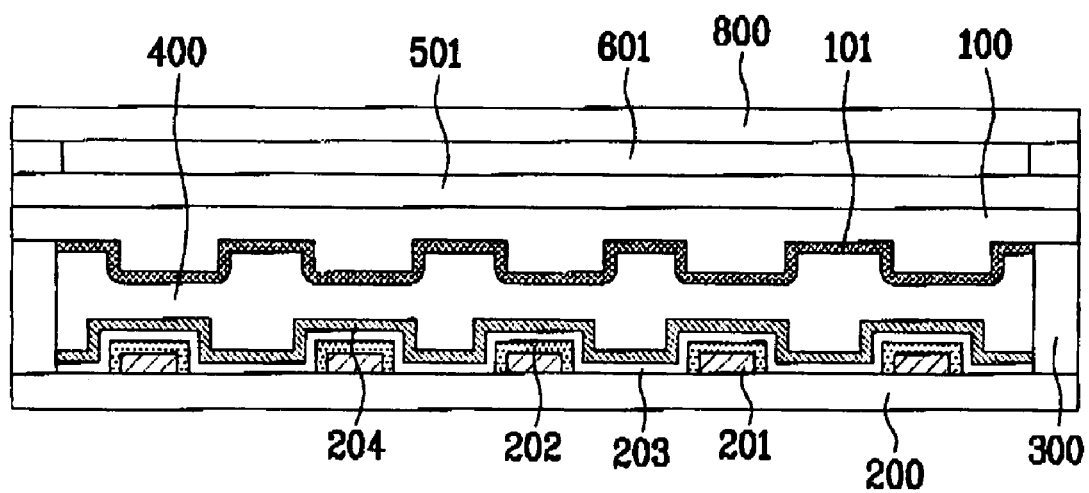
FIG. 17 is a cross-sectional diagram of a flat panel fluorescent lamp according to one exemplary embodiment of the present invention with a liquid crystal display panel.

As illustrated in FIG. 17, the flat panel fluorescent lamp of the present invention may be used in conjunction with a liquid crystal display panel assembly. In FIG. 17, a liquid crystal display panel having an upper substrate 800, a lower substrate 501 and a liquid crystal layer 601 between the upper and lower substrate 800 and 501, may be may be attached to an upper plate 100 of an exemplary embodiment of the flat panel fluorescent lamp according to the present invention. Although only one embodiment of the flat panel fluorescent lamp is illustrated in FIG. 17, one of skill in the art should appreciate that any of disclosed embodiments of the flat panel fluorescent lamp and various modified examples thereof may be used in conjunction with a display as a light source. One of skill in the art should also appreciate that the flat panel fluorescent lamp of the present invention may be used with any of a number of display panels requiring a light source.

Moreover, the first and second fluorescent layers 101 and 204 can be formed of any material enabling photoluminescence that produces visible light using energy of a UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of about 147 nm or about 174 nm wavelength.

The reflective layer 203 on the lower plate 200 leads visible light emitted from the second fluorescent layer 204 to the upper plate 100, thereby improving light efficiency.

Besides, the transparent particles 104 formed on the surface of the upper plate 100 may have wave patterns, saw-tooth patterns, or irregular shapes.

In this case, each of the ball type transparent particles 104 may have a size of about 50 nm~2 μm.

Cylindrical or ball-shaped transparent insulator particles can be used as the spacer 300.

Figure 9:
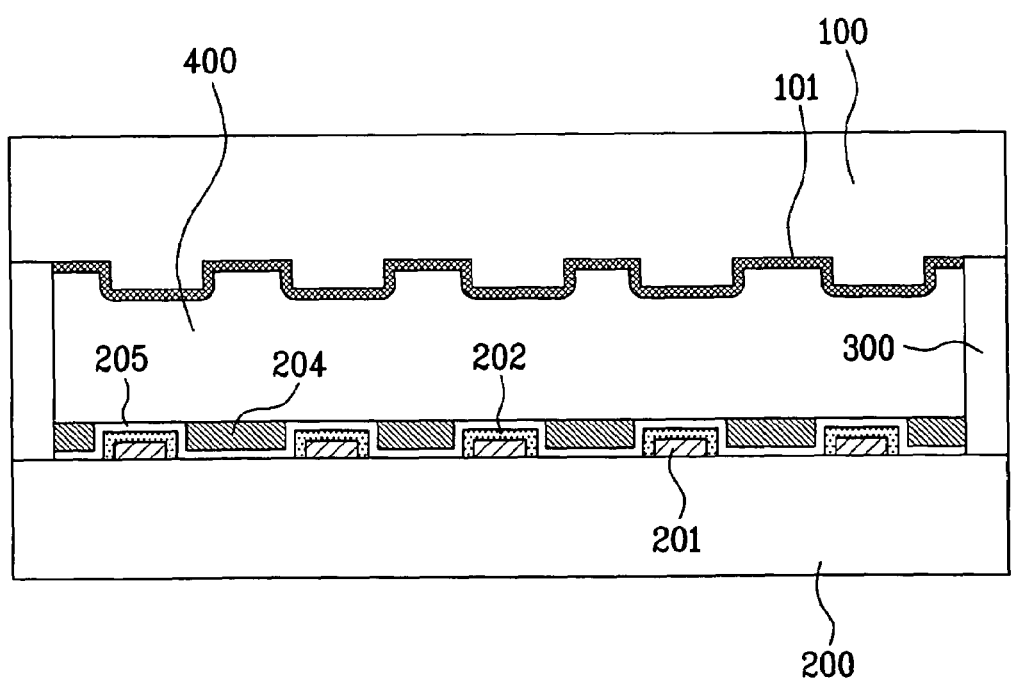
FIG. 9 is a cross-sectional diagram of a flat panel fluorescent lamp according to a fourth embodiment of the present invention.

FIG. 9 is a cross-sectional diagram of a flat panel fluorescent lamp according to a fourth embodiment of the present invention, in which the assembly of the upper plate in FIG. 4A and the lower plate in FIG. 5B is illustrated.

Referring to FIG. 9, a flat panel fluorescent lamp according to a fourth embodiment of the present invention includes an upper plate 100 having a plurality of prominences and depressions on its surface, a first fluorescent layer 101 on the upper plate 100 having the prominences and depressions, a lower plate 200 forming a hermetic space with the upper plate 100 to have a predetermined gap from the upper plate 100, a plurality of electrodes 201 on the lower plate 200 having a uniform distance from each other, an insulating layer 202 enclosing each of the electrodes 201, a secondary electron-producing layer 205 on an entire surface of the lower plate 200 including the insulating layer 202 and the electrodes 201, a second fluorescent layer 204 on the secondary electron-producing layer 205 between the respective electrodes 201, a spacer 300 between edge areas of the upper and lower plates 100 and 200 to support the upper and lower plates 100 and 200, and a discharge gas 400 within the hermetic space between the upper and lower plates 100 and 200.

The discharge gas 400 may include Hg, Xe, Ne, Ar, He, or a mixture gas of Hg, Xe, Ne, Ar, and He and is injected into the hermetic space between the upper and lower plates 100 and 200.

Meanwhile, a coating area of the first fluorescent layer 101 is increased by the prominences and depressions on the upper plate 100, thereby enhancing a produced amount of visible light and reducing total reflection on a flat panel. Hence, light efficiency can be enhanced.

The first and second fluorescent layers 101 and 204 can be formed of any material enabling photoluminescence that produces visible light using energy of a UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of about 147 nm or about 174 nm wavelength.

Moreover, the prominences and depressions formed on the surface of the upper plate 100 may have wave patterns, saw-tooth patterns, or irregular shapes.

Besides, the secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound amplifying an electron ray. Cu/Be or Ag/Mg may generally be used for the secondary electron-producing layer 205.

Meanwhile, the second fluorescent layer 204 includes a plurality of unit blocks to expose portions of the surface of the second-electrons producing layer 205. Electric charges generated from the gas discharge need to directly collide with the secondary electron-producing layer 205 to enable discharge of secondary electrons. If the fluorescent substance entirely covers the secondary electron-producing layer, electric charges fail to directly collide with the secondary electron-producing layer 205 to result in no effect.

In case of using the secondary electron-producing layer 205, the fluorescent layer is not provided to the lower plate 200. Alternatively, if the fluorescent layer is provided to the lower plate to raise brightness with luminosity of the fluorescent layer on the lower plate, the fluorescent layer is patterned like a block shape to expose portions of the secondary electron-producing layer 205. Hence, the fluorescent substance provided to portions of the lower plate emits light, and the secondary electron-producing layer 205 discharges the secondary electrons.

Cylindrical or ball-shaped transparent insulator particles can be used as the spacer 300.

Figure 10:
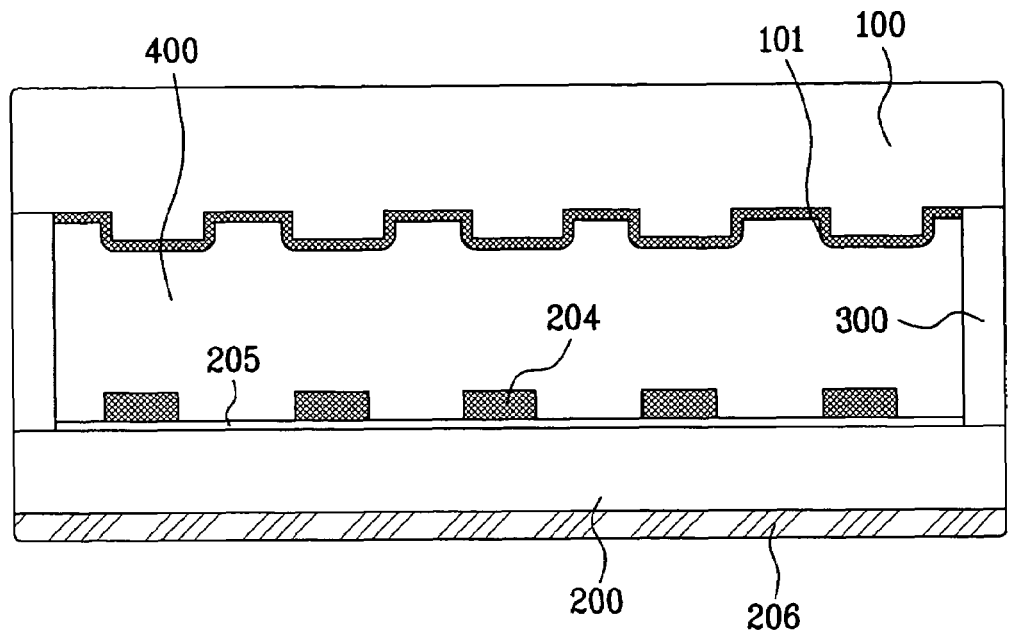
FIG. 10 is a cross-sectional diagram of a flat panel fluorescent lamp according to a fifth embodiment of the present invention.

FIG. 10 is a cross-sectional diagram of a flat panel fluorescent lamp according to a fifth embodiment of the present invention, in which the assembly of the upper plate in FIG. 4A and the lower plate in FIG. 5C is illustrated.

Referring to FIG. 10, a flat panel fluorescent lamp according to a fifth embodiment of the present invention includes an upper plate 100 having a plurality of prominences and depressions on its surface, a first fluorescent layer 101 on the upper plate 100 having the prominences and depressions, a lower plate 200 forming a hermetic space with the upper plate 100 to have a predetermined gap from the upper plate 100, a secondary electron-producing layer 205 on the lower plate 200, a second fluorescent layer 204 on the secondary electron-producing layer 205 to include a plurality of patterns 204 leaving a predetermined distance from each other, a discharge electrode 206 on a backside of the lower plate 200, a spacer 300 between edge areas of the upper and lower plates 100 and 200 to support the upper and lower plates 100 and 200, and a discharge gas 400 within the hermetic space between the upper and lower plates 100 and 200.

The secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound amplifying an electron ray. Cu/Be or Ag/Mg may generally be used for the secondary electron-producing layer 205.

The discharge gas 400 may include Hg, Xe, Ne, Ar, He, or a mixture gas of Hg, Xe, Ne, Ar, and He and is injected into the hermetic space between the upper and lower plates 100 and 200.

Moreover, a coating area of the first fluorescent layer 101 is increased by the prominences and depressions on the upper plate 100, thereby enhancing a produced amount of visible light and reducing total reflection on a flat panel. Hence, light efficiency can be enhanced.

Besides, the first and second fluorescent layers 101 and 204 can be formed of any material enabling photoluminescence that produces visible light using energy of a UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of about 147 nm or about 174 nm wavelength.

The prominences and depressions formed on the surface of the upper plate 100 may have wave patterns, saw-tooth patterns, or irregular shapes.

Moreover, cylindrical or ball-shaped transparent insulator particles can be used as the spacer 300.

Figure 11:
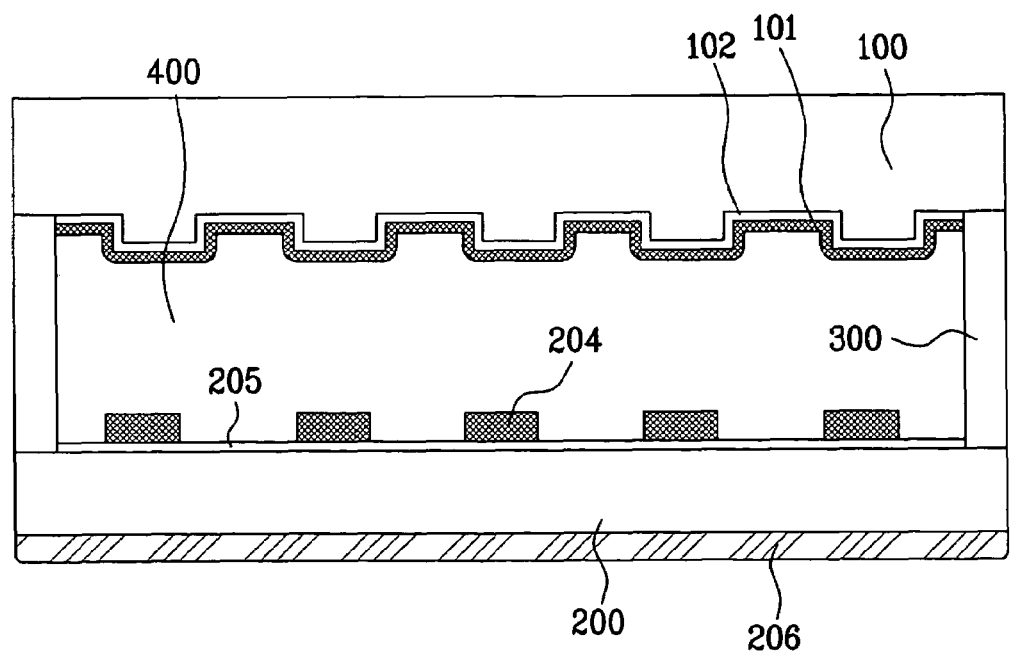
FIG. 11 is a cross-sectional diagram of a flat panel fluorescent lamp according to a sixth embodiment of the present invention.

FIG. 11 is a cross-sectional diagram of a flat panel fluorescent lamp according to a sixth embodiment of the present invention, in which the assembly of the upper plate in FIG. 4B and the lower plate in FIG. 5C is illustrated.

Referring to FIG. 11, a flat panel fluorescent lamp according to a sixth embodiment of the present invention includes an upper plate 100 having a plurality of prominences and depressions on its surface, a transparent electrode 102 of transparent metal such as ITO on the upper plate 100 having the prominences and depressions, a first fluorescent layer 101 on the transparent electrode 102, a lower plate 200 forming a hermetic space with the upper plate 100 to have a predetermined gap from the upper plate 100, a secondary electron-producing layer 205 on the lower plate 200, a second fluorescent layer 204 on the secondary electron-producing layer 205 to include a plurality of patterns 204 having a predetermined distance from each other, a discharge electrode 206 on a backside of the lower plate 200, a spacer 300 between edge areas of the upper and lower plates 100 and 200 to support the upper and lower plates 100 and 200, and a discharge gas 400 existing within the hermetic space between the upper and lower plates 100 and 200.

The secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound amplifying an electron ray. Cu/Be or Ag/Mg may generally be used for the secondary electron-producing layer 205.

The discharge gas 400 may include Hg, Xe, Ne, Ar, He, or a mixture gas of Hg, Xe, Ne, Ar, and He and is injected into the hermetic space between the upper and lower plates 100 and 200.

Moreover, a coating area of the first fluorescent layer 101 is increased by the prominences and depressions on the upper plate 100, thereby enhancing a produced amount of visible light and reducing total reflection on a flat panel. Hence, light efficiency can be enhanced.

Besides, the first and second fluorescent layers 101 and 204 can be formed of any material enabling photoluminescence that produces visible light using energy of a UV-light of about 140 nm~350 nm wavelength such as an organic substance, inorganic substance, rare-earth-metal, polymer, and the like. The first and second fluorescent layers 101 and 204 may be preferably formed of a fluorescent substance producing highly visible light in case of irradiation of vacuum UV-light of about 147 nm or about 174 nm wavelength.

The prominences and depressions formed on the surface of the upper plate 100 may have wave patterns, saw-tooth patterns, or irregular shapes.

Moreover, cylindrical or ball-shaped transparent insulator particles can be used as the spacer 300.

Besides, low-resistance metal such as W-based metal, Ni-based metal, alkali-based metal, and the like may be used as a conductive material for the discharge electrode 206.

Figure 12:
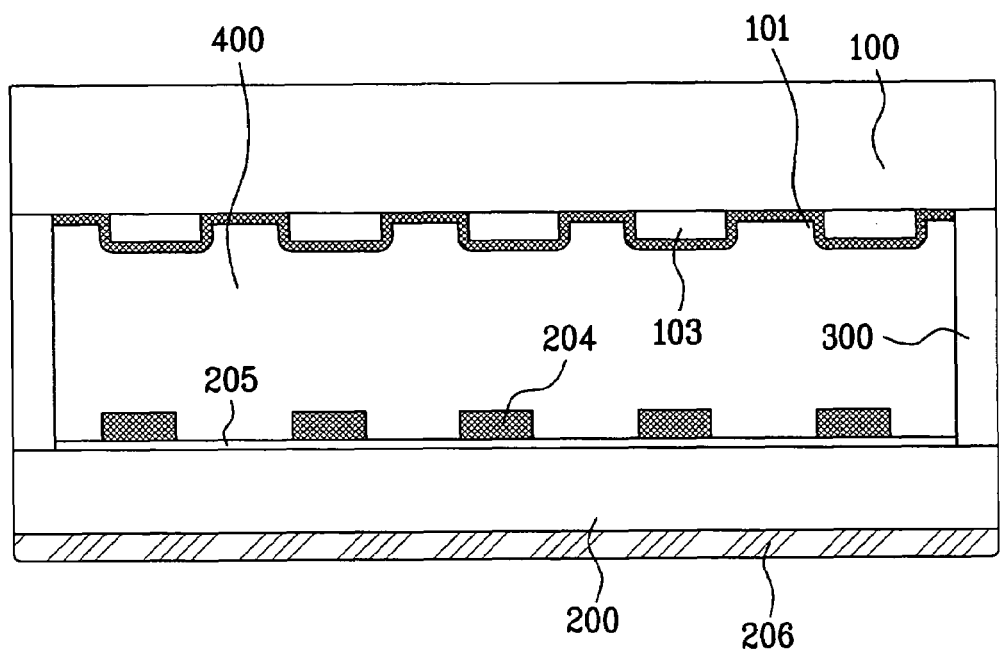
FIG. 12 is a cross-sectional diagram of a flat panel fluorescent lamp according to a seventh embodiment of the present invention.

FIG. 12 is a cross-sectional diagram of a flat panel fluorescent lamp according to a seventh embodiment of the present invention, in which the assembly of the upper plate in FIG. 4C and the lower plate in FIG. 5C is illustrated.

Referring to FIG. 12, a flat panel fluorescent lamp according to a seventh embodiment of the present invention includes an upper plate 100 formed of a transparent material, a plurality of transparent electrode patterns 103 on the upper plate 100 to having a predetermined distance from each other, a first fluorescent layer 101 on the upper plate 100 including the transparent electrode patterns 103, a lower plate 200 forming a hermetic space with the upper plate 100 to have a predetermined gap from the upper plate 100, a secondary electron-producing layer 205 on the lower plate 200, a second fluorescent layer 204 on the secondary electron-producing layer 205 to include a plurality of patterns 204 having a predetermined distance from each other, a discharge electrode 206 on a backside of the lower plate 200, a spacer 300 between edge areas of the upper and lower plates 100 and 200 to support the upper and lower plates 100 and 200, and a discharge gas 400 within the hermetic space between the upper and lower plates 100 and 200.

The secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound amplifying an electron ray. Cu/Be or Ag/Mg may generally be used for the secondary electron-producing layer 205.

The discharge gas 400 may include Hg, Xe, Ne, Ar, He, or a mixture gas of Hg, Xe, Ne, Ar, and He and is injected into the hermetic space between the upper and lower plates 100 and 200.

Moreover, a coating area of the first fluorescent layer 101 is increased by a plurality of the transparent electrode patterns 103 provided to the upper plate 100, thereby enhancing a produced amount of visible light and reducing total reflection on a flat panel. Hence, light efficiency can be enhanced.

Besides, the first and second fluorescent layers 101 and 204 can be formed of any material enabling photoluminescence that produces visible light using energy of UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of about 147 nm or about 174 nm wavelength.

The transparent electrode patterns 103 on the upper plate 100 may be wave patterns, saw-tooth patterns, or irregular shapes.

Moreover, cylindrical or ball-shaped transparent insulator particles can be used as the spacer 300.

Besides, low-resistance metal such as W-based metal, Ni-based metal, alkali-based metal, and the like may be used as a conductive material for the discharge electrode 206.

Figure 13:
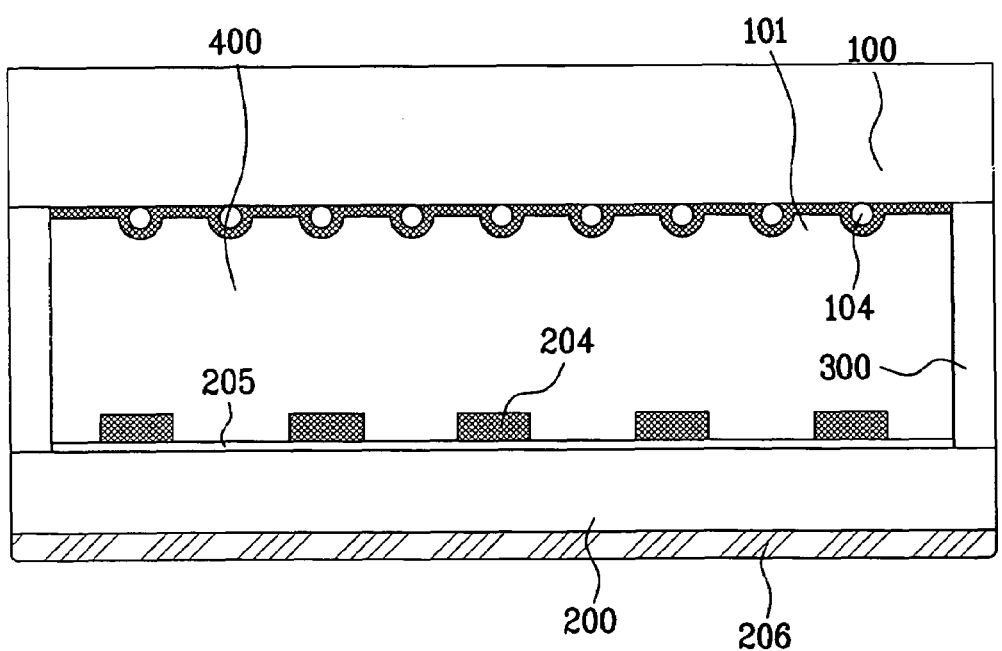
FIG. 13 is a cross-sectional diagram of a flat panel fluorescent lamp according to an eighth embodiment of the present invention.

FIG. 13 is a cross-sectional diagram of a flat panel fluorescent lamp according to an eighth embodiment of the present invention, in which the assembly of the upper plate in FIG. 4D and the lower plate in FIG. 5C is illustrated.

Referring to FIG. 13, a flat panel fluorescent lamp according to an eighth embodiment of the present invention includes an upper plate 100 formed of a transparent material, a plurality of ball type transparent particles 104 on the upper plate 100, a first fluorescent layer 101 on an entire surface of the upper plate 100 including the transparent particles 104, a lower plate 200 forming a hermetic space with the upper plate 100 to have a predetermined gap from the upper plate 100, a secondary electron-producing layer 205 on the lower plate 200, a second fluorescent layer 204 on the secondary electron-producing layer 205 to include a plurality of patterns 204 leaving a predetermined distance from each other, a discharge electrode 206 on a backside of the lower plate 200, a spacer 300 between edge areas of the upper and lower plates 100 and 200 to support the upper and lower plates 100 and 200, and a discharge gas 400 within the hermetic space between the upper and lower plates 100 and 200.

The secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound amplifying an electron ray. Cu/Be or Ag/Mg is generally used for the secondary electron-producing layer 205.

The discharge gas 400 may include Hg, Xe, Ne, Ar, He, or a mixture gas of Hg, Xe, Ne, Ar, and He and is injected into the hermetic space between the upper and lower plates 100 and 200.

Moreover, a coating area of the first fluorescent layer 101 is increased by a plurality of the transparent particles 104 provided to the upper plate 100, thereby enhancing a produced amount of visible light and reducing total reflection on a flat panel. Hence, light efficiency can be enhanced.

Besides, the first and second fluorescent layers 101 and 204 can be formed of any material enabling photoluminescence that produces visible light using energy of a UV-light of about 140 nm~350 nm wavelength such as an organic substance, inorganic substance, rare-earth metal, polymer, and the like. The first and second fluorescent layers 101 and 204 may be preferably formed of a fluorescent substance producing a high visible light in case of irradiation of vacuum UV-light of about 147 nm or about 174 nm wavelength.

The transparent particles 104 on the upper plate 100 may configure wave patterns, saw-tooth patterns, or irregular shapes.

Moreover, cylindrical or ball-shaped transparent insulator particles can be used as the spacer 300.

Besides, low-resistance metal such as W-based metal, Ni-based metal, alkali-based metal, and the like may be used as a conductive material for the discharge electrode 206.

Meanwhile, by considering a refraction index, acquisition feasibility, shaping feasibility, and the like, an inorganic material or resin may preferably be used as a material of the transparent particles 104.

Specifically, in case of using resin or inorganic oxide as the inorganic material, the transparent particles 10b can be easily amorphous. In case of using a material facilitating crystallization, the obtained particle generally tends to have an indeterminate form due to its crystalline structure. For such a reason, it is difficult to form the transparent particle 104 having a smooth surface including either convex surfaces or a combination of convex surfaces and planes.

Hence, using the material that tends to be amorphous, such as inorganic oxide and resin, the particle shape depends on a surface tension and the like. Thus, formation of a transparent particle 104 having a smooth surface including either convex surfaces or a combination of convex surfaces and planes is facilitated.

Crystallinity of the transparent particle 104 can be determined by investigating presence or non-presence of peaks due to the diffraction on a crystalline face using XRD (X-ray diffraction) measurement.

In case of using a mixture of amorphous transparent particles and crystalline transparent particles as the transparent particles 104, a 'crystalline transparent particles to total transparent particles' ratio is preferably set to about 30 wt % or less.

And, particles of silica gel, alumina, or the like can be used as the transparent particles 104 of inorganic oxide.

Moreover, the transparent particles 104 formed of resin can be fluoropolymer particles or silicon resin particles such as the particles of acryl, styrene acryl & its cross-linking agent, melamine-formalin condensate, PTFE (polytetra-fluoroethylene), PFA (perfluoroalkoxy resin), FEP (tetrafluoroethylene-hexafluoropropylene copolymer), DVDF (polyfluorovinylidene), ETFE (ethylene-tetrafluoroethylene copolmer), etc. Silicon resin, melamine resin, or fluoroacrylate resin may be used as the transparent particles 104.

Since the transparent resin mostly has a relatively low refraction index, a silica particle or silicon resin particle having a low refraction index of about 1.40~1.45 (halogen lamp D-ray, 589 nm) is suitable for the transparent particles 104.

Figure 14:
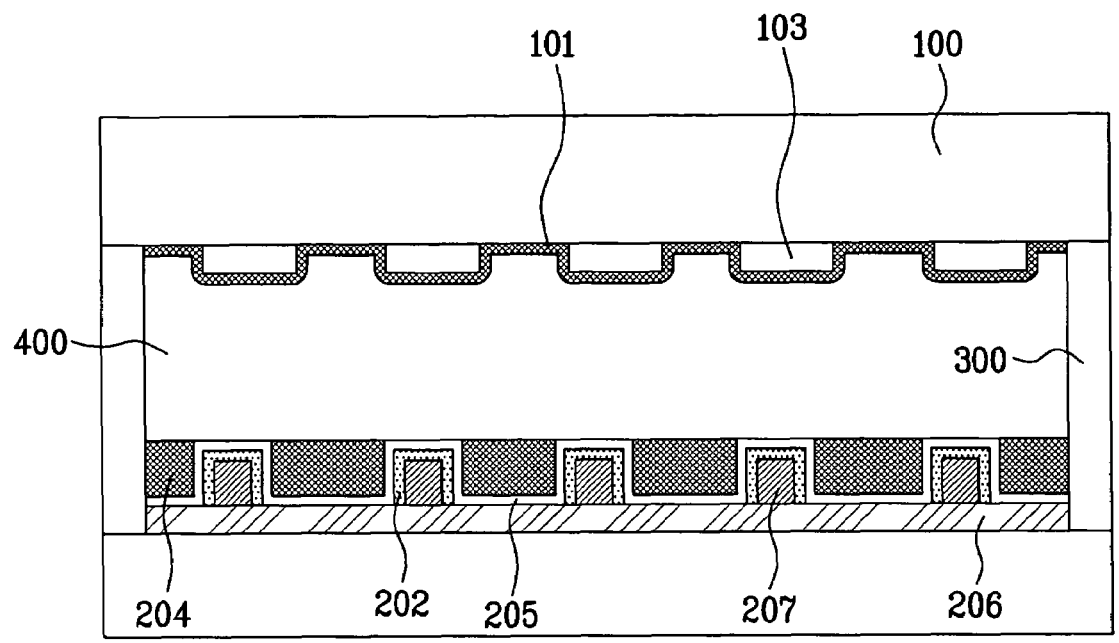
FIG. 14 is a cross-sectional diagram of a flat panel fluorescent lamp according to a ninth embodiment of the present invention.

FIG. 14 is a cross-sectional diagram of a flat panel fluorescent lamp according to a ninth embodiment of the present invention, in which the assembly of the upper plate in FIG. 4C and the lower plate in FIG. 5D is illustrated.

Referring to FIG. 14, a flat panel fluorescent lamp according to a ninth embodiment of the present invention includes an upper plate 100 formed of a transparent material, a plurality of transparent electrode patterns 103 on the upper plate 100 having a predetermined distance from each other, a first fluorescent layer 101 on the upper plate 100 including the transparent electrode patterns 103, a lower plate 200 forming a hermetic space with the upper plate 100 to have a predetermined gap from the upper plate 100, a discharge electrode 206 on the lower plate 200, a plurality of vertical structures 207 on the discharge electrode 206 having a predetermined distance from each other, an insulating layer 202 enclosing each of the vertical structures 207, a secondary electron-producing layer 205 on an entire surface of the lower plate 200 including the insulating layer 202 and the vertical structures 207, a second fluorescent layer 204 on the secondary electron-producing layer 205 between a plurality of the vertical structures 207, a spacer 300 between edge areas of the upper and lower plates 100 and 200 to support the upper and lower plates 100 and 200, and a discharge gas 400 within the hermetic space between the upper and lower plates 100 and 200.

The secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound amplifying an electron ray. Cu/Be or Ag/Mg is generally used for the secondary electron-producing layer 205.

The discharge gas 400 may include Hg, Xe, Ne, Ar, He, or a mixture gas of Hg, Xe, Ne, Ar, and He and is injected into the hermetic space between the upper and lower plates 100 and 200.

Moreover, a coating area of the first fluorescent layer 101 is increased by a plurality of the transparent electrode patterns 103 provided to the upper plate 100, thereby enhancing a produced amount of visible light and reducing total reflection on a flat panel. Hence, light efficiency can be enhanced.

Besides, the first and second fluorescent layers 101 and 204 can be formed of any material enabling photoluminescence that produces visible light using energy of UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of about 147 nm or about 174 nm wavelength.

Cylindrical or ball-shaped transparent insulator particles can be used as the spacer 300.

Moreover, low-resistance metal such as W-based metal, Ni-based metal, alkali-based metal, and the like may be used as a conductive material for the discharge electrode 206.

Besides, the discharge electrode 206 may be formed of the same material of the vertical structures 207. Alternatively, the discharge electrode 206 may be formed of a material different from that of the vertical structures 207.

Figure 15:
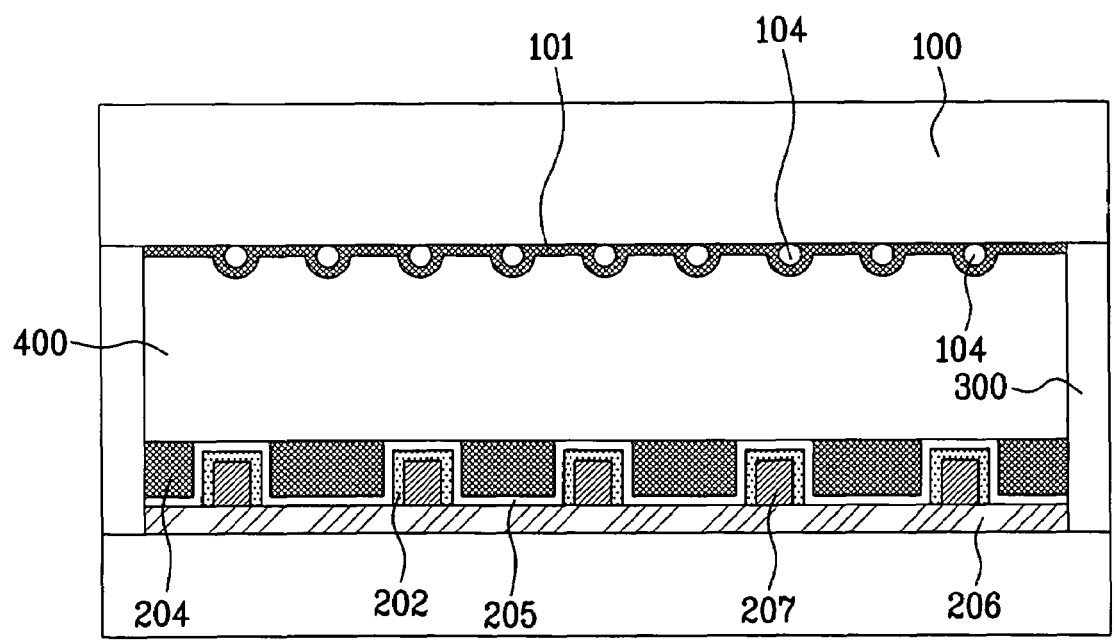
FIG. 15 is a cross-sectional diagram of a flat panel fluorescent lamp according to a tenth embodiment of the present invention.

FIG. 15 is a cross-sectional diagram of a flat panel fluorescent lamp according to a tenth embodiment of the present invention, in which the assembly of the upper plate in FIG. 4D and the lower plate in FIG. 5D is illustrated.

Referring to FIG. 15, a flat panel fluorescent lamp according to a tenth embodiment of the present invention includes an upper plate 100 formed of a transparent material, a plurality of ball type transparent particles 104 on the upper plate 100, a first fluorescent layer 101 on an entire surface of the upper plate 100 including the transparent particles 104, a lower plate 200 forming a hermetic space with the upper plate 100 to have a predetermined gap from the upper plate 100, a discharge electrode 206 on the lower plate 200, a plurality of vertical structures 207 on the discharge electrode 206 having a predetermined distance from each other, an insulating layer 202 enclosing each of the vertical structures 207, a secondary electron-producing layer 205 on an entire surface of the lower plate 200 including the insulating layer 202 and the vertical structures 207, a second fluorescent layer 204 on the secondary electron-producing layer 205 between the plurality of the vertical structures 207, a spacer 300 between edge areas of the upper and lower plates 100 and 200 to support the upper and lower plates 100 and 200, and a discharge gas 400 within the hermetic space between the upper and lower plates 100 and 200.

The secondary electron-producing layer 205 enhances an electron ray amplification effect using an alloy combination of metal such as Cu, Ag, Au, W, and the like and alkali metal including Li, Mg, Ca, Sr, and Ba or alkaline earth metal as a metal compound amplifying an electron ray. Cu/Be or Ag/Mg is generally used for the secondary electron-producing layer 205.

The discharge gas 400 may include Hg, Xe, Ne, Ar, He, or a mixture gas of Hg, Xe, Ne, Ar, and He and is injected into the hermetic space between the upper and lower plates 100 and 200.

Moreover, a coating area of the first fluorescent layer 101 is increased by a plurality of the transparent particles 104 provided to the upper plate 100, thereby enhancing a produced amount of visible light and reducing total reflection on a flat panel. Hence, light efficiency can be enhanced.

Besides, the first and second fluorescent layers 101 and 204 can be formed of any material enabling photoluminescence that produces visible light using energy of UV-light of about 140 nm~350 nm wavelength such as an organic substance, inorganic substance, rare-earth metal, polymer, and the like. The first and second fluorescent layers 101 and 204 may be preferably formed of a fluorescent substance producing highly visible light in case of irradiation of vacuum UV-light of about 147 nm or about 174 nm wavelength.

The transparent particles 104 on the surface of the upper plate 100 may configure wave patterns, saw-tooth patterns, or irregular shapes.

Moreover, cylindrical or ball-shaped transparent insulator particles can be used as the spacer 300.

Besides, low-resistance metal such as W-based metal, Ni-based metal, alkali-based metal, and the like may be used as a conductive material for the discharge electrode 206.

Meanwhile, the discharge electrode 206 may be formed of the same material of the vertical structures 207. Alternatively, the discharge electrode 206 may be formed of a material different from that of the vertical structures 207.

Figure 16:
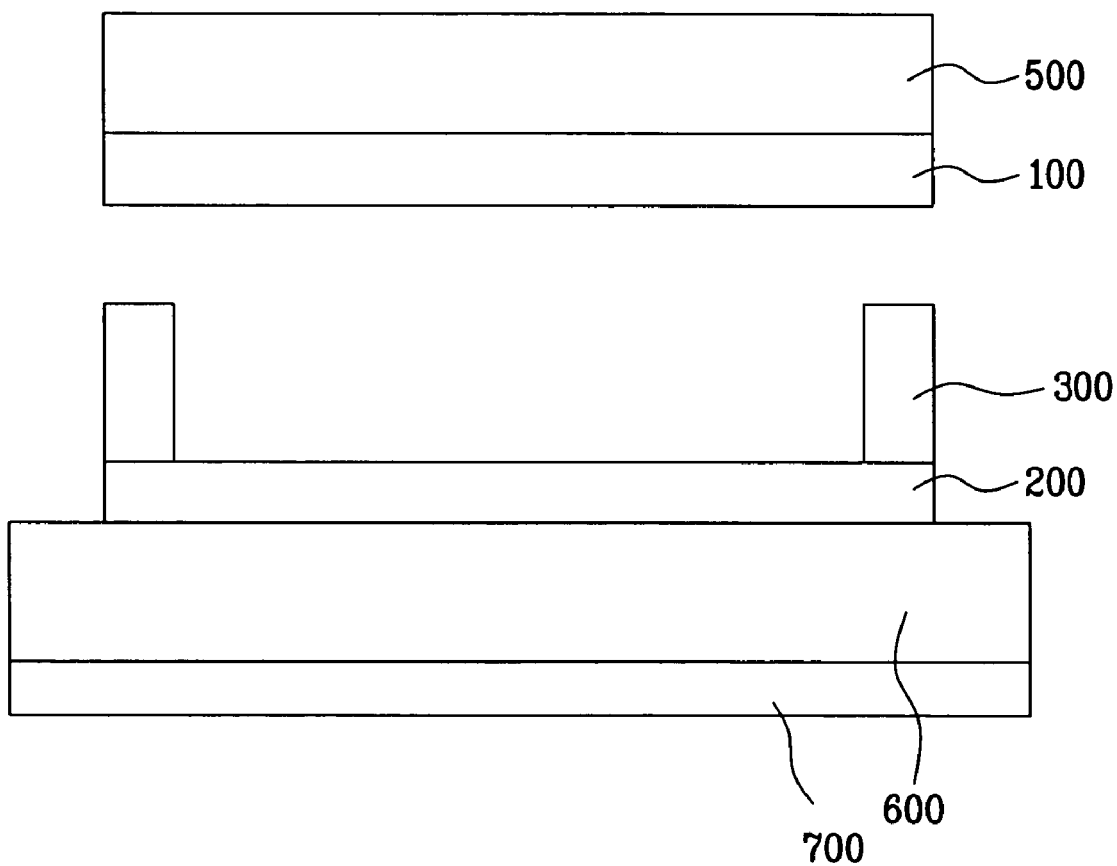
FIG. 16 is a cross-sectional diagram of an assembling equipment for assembling upper and lower plates of the present invention.

FIG. 16 is a cross-sectional diagram of an assembling equipment for assembling upper and lower plates of the present invention.

Referring to FIG. 16, an assembling equipment for assembling upper and lower plates of the present invention includes an upper stage 500, a lower stage 600, and a heating means 700 provided under the lower stage 600.

An upper plate 100 loaded from outside is fixed to a bottom side of the upper stage 500, and a lower plate 200 is fixed to a topside of the lower stage 600.

As mentioned in the foregoing descriptions for FIGS. 4A to 4E, the first fluorescent layer 101, transparent electrode 102, transparent electrode pattern 103, transparent particles 104, and the like are formed on the upper plate 100. As mentioned in the foregoing descriptions for FIGS. 5A to 5E, the electrode 201, insulating layer 202, reflective layer 203, second fluorescent layer 204, secondary electron-producing layer 205, discharge electrode 206, vertical structures 207, and the like are formed on the lower plate 200.

A heating means 700 is to heat the areas to which the adhesive agent is applied to completely attach the upper and lower plates 100 and 200 to each other.

Meanwhile, a spacer 300 formed of a transparent insulator is provided to both side areas on the lower plate 200. The spacer 300 may have a cylindrical or ball type shape.

The upper and lower plates are assembled in a manner of applying an adhesive agent, e.g., UV-hardening agent, epoxy, etc., to an edge area of the upper or lower plate, loading the upper and lower plates 100 and 200 on the upper and lower stages 500 and 600, respectively, in an assembling chamber, sealing the chamber hermetically, adjusting a ratio of gas to be injected, and pressurizing the upper or lower plate within the chamber.

Namely, while the upper and lower plates 10 are loaded on the upper and lower stages 500 and 600, respectively, by electrostatic adsorption, the upper stage 500 is lowered to assemble the upper and lower plates 100 and 200.

In pressurizing the upper and lower plates 100 and 200, the upper or lower stage 500 or 600 is vertically moved to pressurize the upper and lower plates 100 and 200 by varying a moving speed and pressure of the corresponding stage.

Specifically, the corresponding stage is moved at a constant speed or pressure until the upper plate 100 comes into contact with the spacer 300 of the lower plate 200. From an initial contact time point, the pressure is raised up to a final pressure.

For instance, the pressure is adjusted to assemble the upper and lower plates 100 and 200 step by step in a manner of about 0.1 ton at the initial contact time point, about 0.3 ton in an intermediate step, about 0.4 ton in a last step, and about 0.5 ton in a final step.

Meanwhile, in order to completely assemble the upper and lower plates 100 and 200 to each other, a UV-light or laser beam is applied to the area where the adhesive is put, or the area is heated at a specific temperature by the heating means 700.

As illustrate in FIG. 17, the flat panel fluorescent lamp of the present invention may be used in conjunction with a liquid crystal display panel assemble. In FIG. 17, a liquid crystal display panel having an upper substrate 800, a lower substrate 500 and a liquid crystal layer 600 between the upper and lower substrates 800 and 500, may be attached to an upper plate 100 of an exemplary embodiment of the flat panel fluorescent lamp according to the present invention. Although only one embodiment of the flat panel fluorescent lamp is illustrated in FIG. 17, one of skill in the art should appreciate that any of disclosed embodiments of the flat panel fluorescent lamp and various modified examples thereof may be used in conjunction with a display as a light source. One of skill in the art should also appreciate that the flat panel fluorescent lamp of the present invention may be used with any of a number of display panels requiring a light source.

Accordingly, a flat panel fluorescent lamp and fabricating method thereof according to the present invention provide the following effects or advantages.

First of all, total reflection between the fluorescent substance and the transparent electrode, between the fluorescent substance and the transparent substrate, or between the transparent substrate and air is reduced to enhance a light acquisition rate.

Secondly, the prominences and depressions are provided to the surface of the upper plate to increase the coating area of the fluorescent substance, thereby enhancing a produced amount of visible light. The light transmitted through the upper plate is dispersed to enhance uniformity of luminosity.

Thirdly, the secondary electron-producing layer is provided to the lower plate, thereby lowering a discharge driving voltage as well as protecting the insulating layer and electrodes. This layer is capable of reflecting light.

Finally, the vertical structure is provided as the discharge electrode to the lower plate in a direction vertical to the substrate, thereby lowering the discharge driving voltage, fixing a plasma generation position, and enhancing the electric charge uniformity according to the arrangement of the structure.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flat panel fluorescent lamp comprising:
a first fluorescent layer on an upper plate having a plurality of prominences and depressions;
a lower plate leaving a predetermined gap from the upper plate to form a discharge space together with the upper plate;
an electric discharge gas within the discharge space;
a plurality of electrodes on the lower plate;
an insulating layer on the plurality of electrodes;
a secondary electron-producing layer on the lower plate formed the insulating layer; and
a second fluorescent layer on the secondary electron-producing layer, to expose first portions of the secondary electron-producing layer to the discharge space,
wherein the secondary electron-producing layer includes the first portions and second portions, wherein the first portions are directly exposed into the discharge space and wherein the second portions are not exposed into the discharge space by the second fluorescent layer.

2. The flat panel fluorescent lamp of claim 1, wherein the discharge gas includes at least one of Hg, Xe, Ne, Ar, and He.

3. The flat panel fluorescent lamp of claim 1, wherein the first and second fluorescent layer is formed of a material enabling photoluminescence that produces visible light using energy of UV-light of about 140 nm~350 nm wavelength.

4. The flat panel fluorescent lamp of claim 3, wherein the material is selected from the group may include an organic substance, an inorganic substance, a rare-earth metal, and a polymer.

5. The flat panel fluorescent lamp of claim 1, wherein the upper plate is a transparent substrate.

6. The flat panel fluorescent lamp of claim 1, wherein the lower plate is a transparent substrate.

7. The flat panel fluorescent lamp of claim 1, wherein a cross-section of a plurality of the prominences and depressions include wave patterns or saw-tooth patterns.

8. The flat panel fluorescent lamp of claim 1, further comprising a spacer on an edge area of the upper or low plate to provide the predetermined gap.

9. The flat panel fluorescent lamp of claim 8, wherein the spacer comprises a transparent insulator.

10. The flat panel fluorescent lamp of claim 8, wherein the spacer has a cylindrical or ball shape.

11. The flat panel fluorescent lamp of claim 1, wherein the upper and lower plates are assembled to each other using an adhesive agent.

12. The flat panel fluorescent lamp of claim 11, wherein the adhesive agent is either a UV-hardening agent or epoxy.

13. A flat panel fluorescent lamp, comprising:
an upper plate having a plurality of prominences and depressions on a surface;
a first fluorescent layer on the upper plate including the prominences and depressions;
a lower plate having a predetermined gap from the upper plate to form a discharge space together with the upper plate;
a plurality of electrodes on the lower plate having a uniform distance from each other;
an insulating layer enclosing each of the electrodes;
a secondary electron-producing layer on the lower plate formed the insulating layer;
a second fluorescent layer on the secondary electron-producing layer, to expose first portions of the secondary electron-producing layer to the discharge space, wherein the first portions overlap with the plurality of electrodes;
a spacer between edge areas of the upper and lower plates; and
a discharge gas within the discharge space,
wherein the secondary electron-producing layer includes the first portions and second portions, wherein the first portions are directly exposed into the discharge space and wherein the second portions are not exposed into the discharge space by the second fluorescent layer.

14. The flat panel fluorescent lamp of claim 13, further comprising a transparent electrode between the upper plate and the first fluorescent layer.

15. The flat panel fluorescent lamp of claim 14, wherein the transparent electrode is formed of ITO.

16. A flat panel fluorescent lamp, comprising:
a transparent upper plate;
a plurality of transparent electrode patterns on the upper plate having a uniform distance from each other;
a first fluorescent layer on an entire surface of the upper plate including the plurality of the transparent electrode patterns;
a lower plate having a predetermined gap from the upper plate to form a discharge space together with the upper plate;
a plurality of electrodes on the lower plate having a uniform distance from each other;
an insulating layer enclosing each of the electrodes;
a secondary electron-producing layer on the lower plate formed the insulating layer;
a second fluorescent layer on the secondary electron-producing layer, to expose first portions of the secondary electron-producing layer to the discharge space, wherein the first portions overlap with the plurality of electrodes;
a spacer between edge areas of the upper and lower plates; and
a discharge gas within the discharge space
wherein the secondary electron-producing layer includes the first portions and second portions, wherein the first portions are directly exposed into the discharge space and wherein the second portions are not exposed into the discharge space by the second fluorescent layer.

17. The flat panel fluorescent lamp of claim 16, wherein the secondary electron-producing layer includes a metal compound enabling amplification of an electron ray.

18. The flat panel fluorescent lamp of claim 17, wherein the metal compound includes an alloy combination of metal such as Cu, Ag, Au, W, and the like and alkali metal including Li, Mg, Ca, Sr, and Ba or alkaline earth metal.

19. The flat panel fluorescent lamp of claim 17, wherein the metal compound includes one of Cu/Be and Ag/Mg.

20. A flat panel fluorescent lamp, comprising:
a transparent upper plate;
a plurality of transparent particles on the upper plate having a uniform distance from each other;
a first fluorescent layer on an entire surface of the upper plate including a plurality of the transparent particles;
a lower plate having a predetermined gap from the upper plate to form a hermetic space together with the upper plate;
a plurality of electrodes on the lower plate having a uniform distance from each other;
an insulating layer enclosing each of the electrodes;
a second fluorescent layer on an entire surface of the lower plate including the insulating layer;
a spacer between edge areas of the upper and lower plates; and
a discharge gas within the hermetic space between the upper and lower plates.

21. The flat panel fluorescent lamp of claim 20, wherein the transparent particles include an inorganic substance or resin.

22. The flat panel fluorescent lamp of claim 21, wherein the inorganic substance is inorganic oxide.

23. The flat panel fluorescent lamp of claim 20, wherein the transparent particles include a mixture of amorphous transparent particles and crystalline transparent particles.

24. The flat panel fluorescent lamp of claim 23, wherein crystalline transparent particles to the total transparent particles' ratio is about 30 wt % or less.

25. The flat panel fluorescent lamp of claim 20 wherein a 'crystalline transparent particles to total transparent particles' ratio is about 30 wt % or less.

26. The flat panel fluorescent lamp of claim 22, wherein the inorganic oxide includes particles of silica gel, alumina, or the like.

27. The flat panel fluorescent lamp of claim 21, wherein the resin comprises fluoropolymer particles or silicon resin particles such as the particles of acryl, styrene acryl & its cross-linking agent, melamine-formalin condensate, PTFE (polytetra-fluoroethylene), PFA (perfluoroalkoxy resin), FEP (tetrafluoroethylene-hexafluoropropylene copolymer), DVDF (polyfluorovinylidene), ETFE (ethylene-tetrafluoroethylene copolmer), etc.

28. A flat panel fluorescent lamp comprising:
an upper plate formed of a transparent material;
a plurality of transparent particles on the upper plate;
a first fluorescent layer on an entire surface of the upper plate including a plurality of the transparent particles;
a lower plate having a predetermined gap from the upper plate to form a hermetic space together with the upper plate;
a secondary electron-producing layer on the lower plate;
a plurality of second fluorescent layer patterns selectively formed on the secondary electron-producing layer to leave a uniform interval from each other;
a discharge electrode on a backside of the lower plate;
a spacer between edge areas of the upper and lower plates; and
a discharge gas within the hermetic space between the upper and lower plates.

29. A flat panel fluorescent lamp, comprising:
an upper plate formed of a transparent material;
a plurality of transparent electrode patterns on the upper plate;
a first fluorescent layer on an entire surface of the upper plate including a plurality of the transparent electrode patterns;
a lower plate having a predetermined gap from the upper plate to form a discharge space together with the upper plate;
a discharge electrode on the lower plate;
a plurality of vertical structures on the discharge electrode to leave a uniform distance from each other;
an insulating layer enclosing each of the vertical structures;
a secondary electron-producing layer on an entire surface of the lower plate including the insulating layer and the vertical structures;
a second fluorescent layer on the secondary electron-producing layer between each of the plurality of the vertical structures, to expose first portions of the secondary electron-producing layer to the discharge space;
a spacer between edge areas of the upper and lower plates; and
a discharge gas within the discharge spaced,
wherein the secondary electron-producing layer includes the first portions and second portions, wherein the first portions are directly exposed into the discharge space and wherein the second portions are not exposed into the discharge space by the second fluorescent layer.

30. The flat panel fluorescent lamp of claim 29, wherein the vertical structures and the discharge electrode are formed of a same material.

31. A flat panel fluorescent lamp, comprising:
a transparent upper plate;
a plurality of transparent particles on the upper plate;
a fluorescent layer over the transparent particles;
a lower plate having a predetermined gap from the upper plate to form a hermetic space together with the upper plate;
at least one electrode on the lower plate; and
an insulating layer on the at least one electrode.

32. A flat panel fluorescent lamp, comprising:
a transparent upper plate;
a first fluorescent layer having a plurality of transparent particles therein on the upper plate;
a lower plate having a predetermined gap from the upper plate to form a discharge space together with the upper plate;
a plurality of electrodes on the lower plate;
an insulating layer on the plurality of electrodes;
a secondary electron-producing layer on the lower plate formed the insulating layer;
a second fluorescent layer on the secondary electron-producing layer, to expose first portions of the secondary electron-producing layer to the discharge space, wherein the first portions overlap with the plurality of electrodes,
wherein the secondary electron-producing layer includes the first portions and second portions, wherein the first portions are directly exposed into the discharge space and wherein the second portions are not exposed into the discharge space by the second fluorescent layer.

33. A flat panel fluorescent lamp, comprising:
a transparent upper plate;
a transparent electrode on the upper plate;
a first fluorescent layer on the electrode;
a lower plate having a predetermined gap from the upper plate to form a discharge space together with the upper plate;
discharge gas within the discharge space;
a secondary electron-producing layer on the lower plate; and
a second fluorescent layer on the secondary electron-producing layer, to expose first portions of the secondary electron-producing layer to the discharge space,
wherein the secondary electron-producing layer includes the first portions and second portions, wherein the first portions are directly exposed into the discharge space and wherein the second portions are not exposed into the discharge space by the second fluorescent layer.

34. The flat panel fluorescent lamp of claim 33, further comprising a discharge electrode on the lower plate.

35. The flat panel fluorescent lamp of claim 34, wherein the discharge electrode is on a back surface of the lower plate opposite the secondary electron-producing layer.

36. A flat panel fluorescent lamp, comprising:
a transparent upper plate;
a transparent electrode on the upper plate;
a first fluorescent layer on the transparent electrode;
a lower plate having a predetermined gap from the upper plate to form a dischage space together with upper plate;
a plurality of vertical structures on the lower plate;
an insulating layer on the vertical structures;
a secondary electron-producing layer on the insulating layer; and
a second fluorescent layer on the secondary electron-producing layer, to expose first portions of the secondary electron-producing layer to the discharge space, wherein the first portions overlap with the plurality of vertical structures,
wherein the secondary electron-producing layer includes the first portions and second portions, wherein the first portions are directly exposed into the discharge space and wherein the second portions are not exposed into the discharge space by the second fluorescent layer.

37. The flat panel fluorescent lamp of claim 36 further comprising a discharge electrode on the lower plate.

38. A liquid crystal display device, comprising:
a liquid crystal display panel having an upper substrate and lower substrate and a liquid crystal layer between the upper substrate and the lower substrate; and a flat panel fluorescent lamp below the liquid crystal display panel, the flat panel fluorescent lamp having:

a fluorescent layer on an upper plate having a plurality of prominences and depressions;

a lower plate leaving a predetermined gap from the upper plate to form a discharge space together with the upper plate;

an electric discharge gas within the discharge space;

a plurality of electrodes on the lower plate;

an insulating layer on the plurality of electrodes;

a secondary electron-producing layer on the lower plate formed the insulating layer; and a second fluorescent layer on the secondary electron-producing layer, to expose first portions of the secondary electron-producing layer to the discharge space, wherein the secondary electron-producing layer includes the first portions and second portions, wherein the first portions are directly exposed into the discharge space and wherein the second portions are not exposed into the discharge space by the second fluorescent layer.

* * * * *